(12) United States Patent
Bellotti et al.

(10) Patent No.: US 7,089,287 B2
(45) Date of Patent: Aug. 8, 2006

(54) MESSAGE-BASED SYSTEM HAVING EMBEDDED INFORMATION MANAGEMENT CAPABILITIES

(75) Inventors: Victoria M. Bellotti, San Francisco, CA (US); Ian E. Smith, San Francisco, CA (US); Mark A. Howard, San Francisco, CA (US); Nicolas B. Ducheneaut, Albany, CA (US); Christine M. Neuwirth, Pittsburgh, PA (US); Richard R. Burton, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 672 days.

(21) Appl. No.: 10/046,581

(22) Filed: Jan. 16, 2002

(65) Prior Publication Data

US 2003/0135659 A1 Jul. 17, 2003

(51) Int. Cl.
*G06F 15/16* (2006.01)
(52) U.S. Cl. .................. 709/206; 709/217; 715/738
(58) Field of Classification Search .............. 709/201, 709/212, 228, 242, 244, 204–206, 217, 219; 707/10, 203, 204; 713/201; 715/738; 345/619
See application file for complete search history.

(56) References Cited

U.S. PATENT DOCUMENTS 5,862,325 A * 1/1999 Reed et al. .................. 709/201
2002/0138582 A1 * 9/2002 Chandra et al. ............ 709/206

OTHER PUBLICATIONS

"TaskMaster: Resource management in an email client", speaker Victoria Bellotti, Stanford University, http://64.233.161.104/search?q=cache:lcROIVmSSvlJ:murl.microsoft.com/videos/stanford/cs547d/030214_OnDemand_100_10K_320x240.htm+taskmaster+email&hl=en&s.*

Boone, G. (1998). Concept Features in Re: Agent, an intelligent Email Agent. In Proceedings The Second International Conference on Autonomous Agents, ACM, NY. 141-148.

Cadiz, J.J., Dabbish, L., Gupta, A., & Venolia, G.D. (2001). Supporting Email Workflow. MSR-TR-2001-88: Microsoft Research.

Gwizdka, J. (2002). Reinventing the Inbox: Supporting Task Management of Pending Tasks in Email. In Proceedings of CHI 2002 Human Factors in Computing Systems, ACM, NY, 550-551.

MacKay, W.E. (1998). More than Just a Communication System: Diversity in the Use of Electronic Mail. In Proceedings of CSCW '88, Conference on Computer-Suported Cooperative Work, ACM NY, 26-28.

(Continued)

*Primary Examiner*—Jeffrey Pwu

(57) ABSTRACT

A method and a system for managing and tracking information items within a message-based system on a user system are disclosed. The message-based system has a viewer. A thrask is generated. The thrask includes at least one information item having a set of metadata. A new information is sorted into the thrask in accordance with at least one criterion. The thrask and at least one of the metadata of one of the information items in the thrask are displayed in the viewer.

50 Claims, 18 Drawing Sheets

OTHER PUBLICATIONS

Mock, K. (2001), An Experimental Framework for Email Categorization and Management. In Proceedings of The 24the Annual International ACM SIGIR Conference on Research and Development in Information Retrieval, ACM NY, 392-393.

Rohall, S.L., Gruen, D., Moody, P., & Kellerman, S. (2001). Email Vsualizations to Aid Communications. In Proceedings of InfoVis 2001 The IEEE Symposium on Information Visualization, IEEE. 12-15.

Segal, R.B., & Kephart, J.O. (1999). MailCat: An Intelligent Assistant for Organizing E-mail. In Proceedings of The Third Annual Conference on Autonomous Agents, ACM NY, 276-282.

Takkinen, J., & Shahmehri, N., (1998). Café: A conceptual Model for Managing Information in Electronic Mail. In Proceedings of HICSS-31, The 31$^{st}$ Hawaii International Conference on System Sciences, 44-53.

Whittaker, S., & Sidner, C. (1996). Email overload: exploring personal information management of email. In Proceedings of CHI '96, Conference on Human Factors in Computing Systems, ACM, NY, 276-283.

Pending U.S. Appl. No. 10/646,582, Victoria C. Bellotti, et al.

Pending U.S. Appl. No. 10/406,409, Victoria C. Bellotti, et al.

* cited by examiner

| Title | Due | Balls | Most Recent Sender | Date | Notes |
|---|---|---|---|---|---|
| Options | | | | | |
| Incoming New Items | | | Mata Hari | 10/27/01 | Call with cha |
| Purchasing | ▪▪ | • | Imelda Marcos | 10/17/01 | |
| Talks and events | | | George Bush | 09/22/01 | Empty crisper |
| SHY2003 Reviews | ▮▮▮ | ••••• | Don Norman | 10/01/01 | |
| Appraisals | ▮▪ | •••••• | Bart Simpson | 10/27/01 | Send new for |
| Cloud 9 | ▪▪▪ | •••• | Diana Spencer | 10/27/01 | |
| End of the Rainbow | ▪▪▪ | •••••• | Dorothy Gale | 10/26/01 | |
| Expenses | ▪ | •••••• | John Doe | 10/27/01 | |

*FIG. 10*

| | ? | 8 | Sender | Subject | Options | Arrived | | Due | | Slicky Notes |
|---|---|---|---|---|---|---|---|---|---|---|
| | | | Alice Anderson | Re: Budget Meeting | ▲ | Today | 3:15pm | ⊙ ♈ | ● | Call John |
| | | ↻ | Elizabeth Tailor | Agenda2.doc | ▲ | Today | 2:05pm | | ○ | |
| | | | Clark Gabe | Not coming | ▲ | Today | 11:47am | | ● | Find replacement |
| | | | Alice Anderson | Tuesday calls log | ▲ | Today | 10:22am | ⊙ ♈ | ● | |
| | | | Alice Anderson | To do | ▲ | Yesterday | 5:39pm | ⊙ ♈ | ○ | |
| | | | Marilyn Munroe | Slides and handouts | ▲ | Yesterday | 5:31pm | | ○ | |
| | | | Marilyn Munroe | *FutureFast.ppt* | ▲ | Yesterday | 5:31pm | | ○ | |
| | | | Marilyn Munroe | *Handouts.doc* | ▲ | Yesterday | 5:31pm | | ○ | |
| | | | John Spiggens | Re: Budget Meeting | ▲ | 10/25/01 | 8:35pm | | ● | |
| | | | John Spiggens | http://www.stars.com/plbs/repc.... | ▲ | 10/25/01 | 8:35pm | ♈ | ○ | |
| | | | Marilyn Munroe | Re: Carpool anyone | ▲ | 10/22/01 | 11:36pm | | ○ | |
| | | | Richard Button | Carpool anyone? | ▲ | 10/22/01 | 11:19pm | | ○ | |
| | | | Alice Anderson | Budget Meeting? | ▲ | 10/21/01 | 9:58pm | ♈ | ○ | |

*FIG. 14*

| Sender | | Subject | Due date | Received | Thrask resources |
|---|---|---|---|---|---|
| Bellotti, Victoria | | IP stuff | | | ▲ ▲ |
| ✉ | | | | 10/26/01 | 🌐 http://www.parc.xerox.com/ic |
| 📞 | [Saved Message] | Call lawyer | | 10/25/01 | 📄 taskmaster features.doc |
| ✉ | Ducheneaut, Nicolas | Check this out | | 10/25/01 | 📄 meeting slides.ppt |
| 📞 | Smith, Ian | Slides for meeting | 11/02/01 | 10/23/01 | |
| | Etc. | Etc. | | Etc. | Thrask calendar |
| | Etc. | Etc. | | | Tuesday |
| | Etc. | | | | 11:00 AM — Call lawyer |

*FIG. 15*

MESSAGE-BASED SYSTEM HAVING EMBEDDED INFORMATION MANAGEMENT CAPABILITIES

CROSS-REFERENCE TO RELATED APPLICATIONS

The present application is related to the following co-pending applications: Ser. No. 10/046,582 entitled "Method and System for Flexible Workflow Management" and Ser. No. 10/046,409 entitled "User Interface for a Message-based System Having Embedded Information Management Capabilities", both filed Jan. 16, 2002 on the same date as the present application and commonly assigned to the present assignee.

BACKGROUND OF THE INVENTION

1. Field of the Invention

The present invention relates generally to methods and systems for supporting the management of tasks and documents within a message-based system, and more particularly to methods and systems for embedding personal information management and collaborative and coordination-related information management in a message-based system 2. Description of Related Art Personal information management can be defined as the ordering of information through categorization, placement, or embellishment in a manner that makes it easier to retrieve when it is needed. It may also involve information related to coordination and collaboration. Email is increasingly used by many users for many information management (IM) functions. Currently, email clients such as Microsoft Outlook™ do have features that support many IM functions. However, these features are not easy to use and are not well integrated with email. Thus, there is a need for an email client with embedded IM features, or more generally, a message-based system with embedded IM features.

There are, broadly speaking, three types of traditional workflow systems: image-based workflow systems, form-based workflow systems, and coordination-based workflow systems.

Image-based Workflow Systems are designed to automate the flow of paper-based documentation through an organization, by transferring the paper to digital "images". These were the first workflow systems that gained wide acceptance. These systems are closely associated with imaging technology, and emphasize the routing and processing of digital images.

Form-based Workflow Systems are designed to intelligently route forms throughout an organization. These forms, unlike images, are text-based and consist of editable fields. Forms are automatically routed according to the information entered on the form. In addition, these form-based systems can notify or remind people when action is due.

Coordination-based Workflow Systems are designed to facilitate the completion of work by providing a framework for coordination of action. The framework is aimed at addressing the domain of human concerns (business processes), rather than the optimization of information or material processes.

These three types of workflow systems all share the same requirement. The requirement is that a top-down, centralized model of the work process has to be defined. The centralized workflow model keeps track of a pre-specified set of deadlines and obligations, thus, does not allow for flexible workgroup performance. Therefore, there is a need for a workflow system that would allow for more flexible workflow management, without the need for multiple parties to be using a single centralized system or workflow schema.

SUMMARY OF THE INVENTION

A method and a system for managing and tracking information items within a message-based system on a user system are disclosed. The message-based system has a viewer. A thrask is generated. The thrask includes at least one information item having a set of metadata. A new information is sorted into the thrask in accordance with at least one criterion. The thrask and at least one of the metadata of one of the information items in the thrask are displayed in the viewer.

BRIEF DESCRIPTION OF THE DRAWINGS

The features and advantages of the present invention will become apparent from the following detailed description of the present invention in which:

FIG. 10 shows a different design embodiment for the thrask list pane P1 which includes additional features.

FIG. 14 shows one embodiment of the item list pane P2.

FIG. 15 shows another embodiment of the item list pane P2.

DETAILED DESCRIPTION OF THE INVENTION

Figure 1:
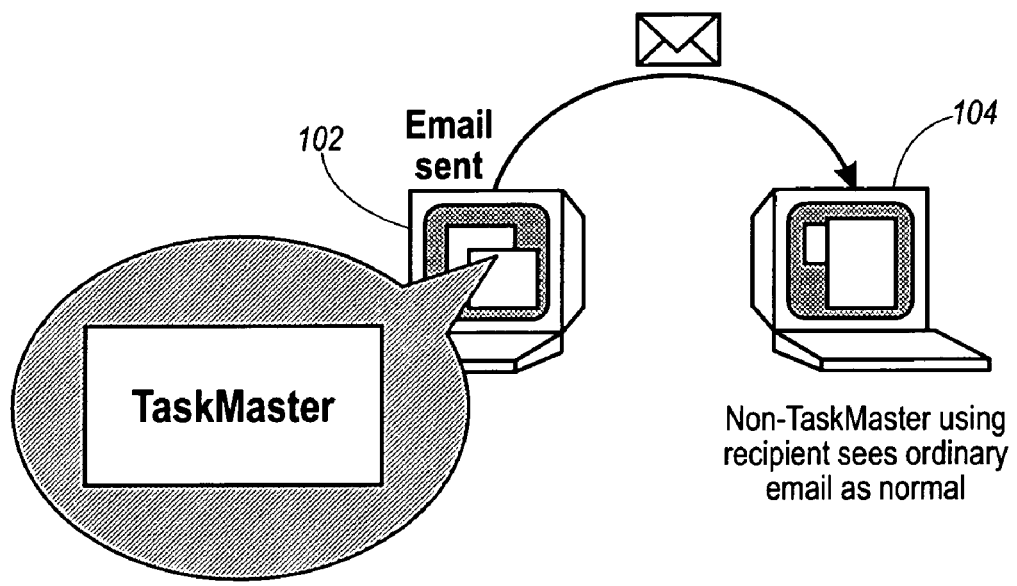
FIG. 1 shows an illustration of embedding information management in the email client mechanism using the system of the present invention, called TaskMaster.

For clarity purposes, some terms that will be used hereinafter are defined here. The term "document" is used to denote any information item that is not a message. The term document is meant to include links (URLs), notes, attachments to mail messages, etc.

The term "message" is defined as a finite unit of communication (suitable for, but not limited to human-human communication; e.g., a machine may be substituted for a human) that can be sent (in one transmission action, as opposed to streamed continuously) through a network from a sender to one or more recipients (where the recipient may be the sender). The communication is usually text but may include video or audio. The communication may also include entire files (such as email attachments).

The term "email client" is defined as a piece of software that recognizes and handles exchange of computer-stored messages (email messages) by telecommunication. Email is one of the protocols included with the Transport Control Protocol/Internet Protocol (TCP/IP) suite of protocols. A popular protocol for sending e-mail is Simple Mail Transfer Protocol and a popular protocol for receiving it is POP3.

The term "message-based system" is defined as piece of software that handles or incorporates the transfer of messages as a core function including, but not limited to email messages. Such a system may use a private protocol that is not understood by email clients, and it may include other features beyond email such as document management and workflow resources. Thus, email clients form a subset of the set of message-based systems.

A task is defined as an activity assigned to or taken on by someone with some criteria for accomplishment or progress and some goal or goals (such as balance budget). It may or may not have a deadline. A human task cannot be fully embodied in any system representation, because it is purely a matter of judgment as to what a task is. However, system items such as documents or messages can be used to stand as task representations or reminders in the user's mind.

A thread is defined as a protracted activity comprising one or more tasks with some thematic relationship such as similar or the same goals, or a common set of colleagues involved, without necessarily having criteria for accomplishment since the thread may not have a final deadline or a termination state (such as the thread for tracking budget surplus). A thread cannot be fully represented by a system object or objects. However, items can be used to stand for threads in terms of having content largely or wholly related to a thread within a single collection of items.

In Microsoft Outlook™, the term thread is used to refer to a series of email messages that can be related to one another using sender, recipient, subject line and message ID information.

In the present invention, the new term "thrask" is defined. Inasmuch as the term thrask refers to a collection of related items in the browser of the present invention, it is like a Microsoft Outlook™ thread. However, a thrask is less easy to capture technically, because it does allow for an element of human judgment. Thus, in the present invention, the term thrask encompasses much more than what is defined for a thread in Microsoft Outlook™. The following are some differences between thrasks and Microsoft Outlook™ threads.

A thrask is a cross between a task and a thread. A thrask may or may not have a single deadline, and may or may not include items representing multiple tasks.

A thrask may or may not correspond to a series of messages of the sort that can be computed by Outlook™ for an Outlook™ thread. In a similar way to Outlook™, in the system of the present invention, new items are added to the thrask automatically using sender, recipient, subject line and message ID information. However, by contrast with Outlook™ threads, a user can manually add items to, or remove them from a thrask. A user can also change the name of a thrask.

A thrask can include not only messages (or not even any messages), but other items as well, since users are not confined to working only with email content. Other items can be documents and links that have never been embedded in an email message. They can be notes, sharing many of the properties of unsent messages in the system of the present invention. These items can be included into a thrask via a menu option or by drag-and-drop into TaskMaster. Thrasks are fully integrated with email functionality. The system of the present invention brings this stream-based multi-form document collection capability into a message-based collection viewer.

Each item within a thrask can have a deadline and a reminder attached to it as it may correspond to a task, or include task critical information, and thus can stand for a task.

There may be many items with deadlines or reminders inside a single thrask. The thrask is the online structure in the system of the present invention that stands for the relations between, or organizes related human tasks represented by different messages and other items.

A thrask may also contain other augmentations such as indicators manipulated by the user to show obligations (whose court the ball is in) for a particular task, additional "stick-on" notes that can be attached to items in the thrask, tools to help the user manage the thrask contents such as filtering for items which the user is obliged to complete as tasks, indicators identifying different versions of the same document within the thrask, indicators as to whether a task has been terminated, and so on.

A thrask may be very different from an Outlook task, depending on how it is implemented in an application. Some of the differences are the following.

A thrask is embedded in the email handling part of the system of the present invention, while an Outlook task is a separate kind of item that is typically accessed in a separate part of the application (the task folder) but can also be seen in Outlook's calendar view.

A thrask can comprise many items rather than just one item like an Outlook task. A thrask includes incoming items, more like an Outlook thread than an Outlook task.

Each information item in a thrask can have metadata associated with it in the system of the present invention. The metadata include message-related information such as sender, subject, date, priority, and task-related information such as deadline, reminder, who is responsible for action, which thrask (or thrasks) the item belongs to, etc. In certain applications of the present invention, a thrask can be implemented as a thread of messages only, or just a single message or a single document that is augmented with information management features and with easy access to useful associated options. For example, a thrask can be implemented as a thread that has some of the task-related metadata described herein. These data go beyond the simple mark-up of importance or follow-up marks used in other messaging tools to include any of: denotation, directly in the display of flow of messages and other items, of who has obligations, when they are due and reminder and deferral functions, plus access to useful response options directly from items having system triggers based on these metadata. A thrask may also be implemented as a message that has some task-related metadata and options in addition to ordinary message-related data as described in the preceding sentence.

For simplicity and clarity, the system of the present invention is referred to as TaskMaster hereinafter.

Many multi-user messaging systems, such as an e-mail system operate on a client-server architecture. A messaging server provides a collection and notification function for incoming messages (e.g., e-mail). When a message is received for a user, it is routed to the "mailbox" for that user. The user access to the mailbox is through a messaging (or e-mail) client. The server typically resides on a network accessible computer based system. The client may typically reside on a personal workstation or other system locally accessible by a user. Alternatively, messaging (or e-mail) systems may be centrally managed wherein users access an e-mail application directly and there is no e-mail client. Such systems are found for example on the World Wide Web (e.g., the Hotmail application). It would be apparent to one of skill in the art that the TaskMaster system could be implemented on any type of e-mail system other than the one described. Such implementations would not depart from the spirit and scope of the TaskMaster system described herein.

FIG. 1 shows an illustration of embedding information management in the messaging mechanism using TaskMaster. Referring to FIG. 1, the TaskMaster user 102 runs TaskMaster as the sole message-based system. TaskMaster user 102 can send messages to non-TaskMaster using recipient 104 who sees the messages as normal. TaskMaster, as an integrated solution, runs as a message-based system but with information management capabilities embedded directly in the message handling part of the system.

Another embodiment of TaskMaster can run as an additional email client on a user system. The user would have two email clients, the TaskMaster and an existing email client such as Microsoft Outlook™, Eudora™, but would need to run only TaskMaster (the use of the name of the mail application Outlook will be understood hereinafter to stand for any mail client with similar capabilities). TaskMaster mirrors Outlook content while adding advanced support for task and information management. TaskMaster can import old messages from Outlook, but once installed, TaskMaster keeps on updating its content from Outlook's incoming messages. However, items that are deleted from one mail client remain in the other, unless they are also deleted there. Non-TaskMaster recipients of mail from a TaskMaster user would see email as normal. This embodiment would probably gain more acceptance from users than the embodiment where TaskMaster is the integrated solution, since most users would likely be reluctant to switch to a new message-based system even if the new message-based system has more capabilities. For this reason, this embodiment of TaskMaster will be described in detail. However, this is not to be construed as a limitation of the present invention.

Figure 2:
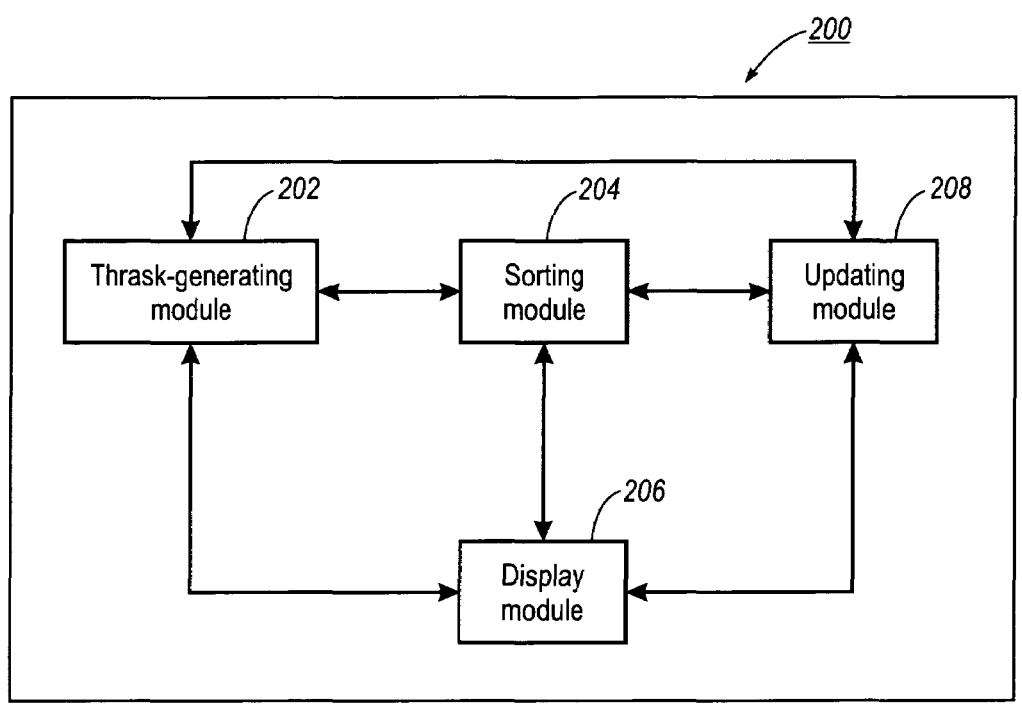
FIG. 2 illustrates an embodiment of TaskMaster.

FIG. 2 illustrates an embodiment of TaskMaster. The embodiment 200 of the TaskMaster includes a thrask generating module 202, a sorting module 204, a display module 206, and further includes an updating module 208. In one implementation, the message viewer has three viewing panes.

The thrask generating module 202 generates a set of thrasks (e.g., by reference to a set of archived data in TaskMaster's database). Each of the thrasks includes at least one information item. Each of the information items can have metadata that may be identical to metadata of a task, such as a deadline or reminder, or the thrask metadata may be an aggregate of, or an abstraction from the metadata of the items it contains.

The sorting module 204 receives (by automatic or user selection) and sorts a new information item into one of the thrasks in accordance with certain criteria or accepts an item from the users' existing items in their computer filing system or messaging system into a new thrask by user action.

The display module 206 causes display, in the first viewing pane, of some of the thrasks, and in the second viewing pane a list of the information items of a single thrask selected from the displayed thrasks, and in the third viewing pane some of the content of an information item selected from the list of the displayed information items. For each of the displayed information items in the second viewing pane, respective metadata may be displayed.

The updating module 208 updates the thrasks. This includes updating the list of thrasks, the list of items in each of the thrasks, and the metadata of the information items in each of the thrasks.

Figure 3:
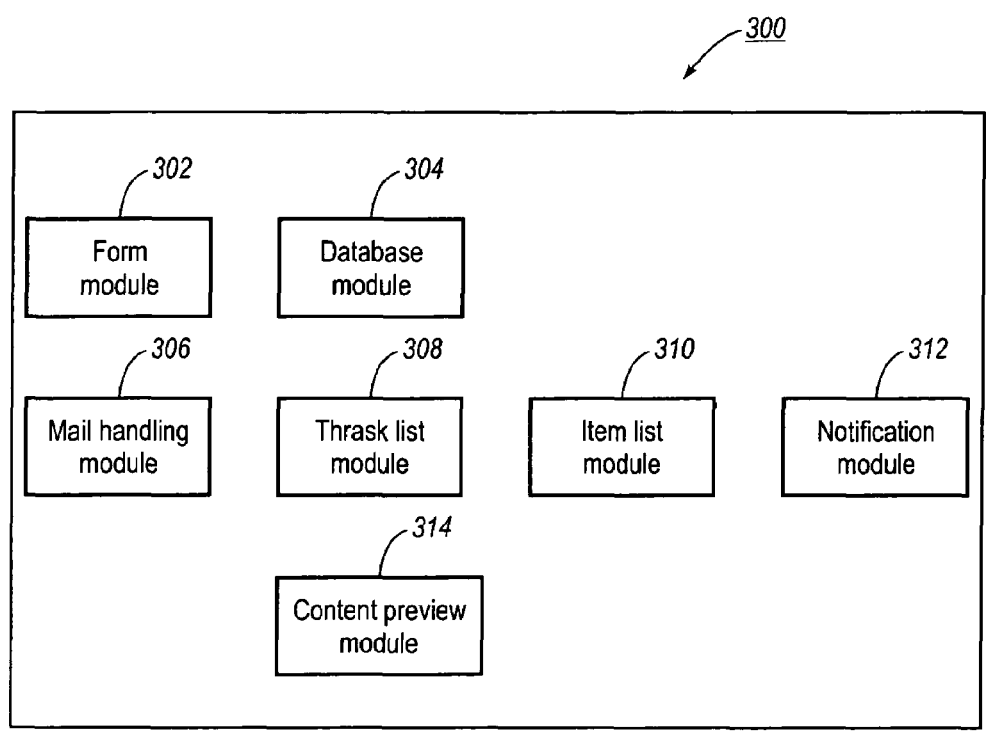
FIG. 3 illustrates another embodiment of TaskMaster.

FIG. 3 illustrates another embodiment of TaskMaster. The embodiment 300 of TaskMaster includes a mail handling module 306, a thrask list module 308, an item list module 310, and a notification module 312. The system 300 further includes a form module 302 and a database module 304. Optionally, the system also includes a content preview module 314.

The form module 302 manages the set of forms that are needed by the system 300. A form is a window that is visible to the user. For example, the main window of the TaskMaster is a form. The form module 302 handles the initialization of the main window. In one embodiment, the main window has three viewing panes. The form module 302 does not generally handle the specific details of the three viewing panes, as each of the viewing panes is handled by its respective module, as will be described later.

The form module 302 also contains logic to handle the compose form which allows the user to write, save, and send a new message. It is noted that there may be many compose windows visible at the same time on the screen, but they are all instances of the same compose form.

The form module 302 also manages the item form that allows the user to see all the details of an item in the item's own pane within the main window of TaskMaster. Message items can be opened in a separate window (e.g., by double clicking the items in the item list view in P2; the second viewing pane, in FIG. 9) within TaskMaster, but non-message items will be opened in their own native application window if the user selects them to do so (e.g., by double clicking on them in P2).

The database module 304 provides a convenient way to access the relational database that holds the data of the TaskMaster. The database module 304 has no effects that are visible to the user.

The mail handling module 306 coordinates with an email client that also resides on the user system, such as Microsoft Outlook™. The mail handling module 306 receives an event from Outlook that a new mail item has been received. The mail handling module 306 then imports the new mail item into TaskMaster. After importing the new mail item, the mail handling module 306 informs the notification module 312, which then makes decisions about which other modules need to be informed of the presence of the new message and any other information items that are produced from the importing process of the new mail item.

The process of importing an item from Outlook into TaskMaster has two phases, first the incorporation phase, then the "thrasking" phase. In the incorporation phase, the contents of the new mail item are copied and appropriate database tables are updated. In TaskMaster, links, i.e., URLs, in the text of the mail message and attachments may be considered as first class citizens, that is, on the same level as the mail message. Thus, the mail handling module 306 may create several information items from a single mail item during the incorporation phase. In the thrasking phase, the information items produced from the incorporation phase must be put into appropriate thrasks. In one embodiment of the mail handling module 306, the mail handling module 306 searches for a previous message that has been placed in a thrask to which the new message with any associated information items is a response. If such a message is found, the new message and any associated information are placed in the same thrask by updating the appropriate database tables. If no such message is found, the message and its associated items are placed in a default thrask called "Pending Items" thrask. After the thrasking phase is complete, the mail handling module 306 informs the notification module 312 of the presence of the new information items. The notification module 312 then coordinates with other modules to update the screen for the user.

The thrask list module 308 controls the display of and user interaction with the thrask list in a screen area referred to as the first viewing pane (or P1). The thrask list contains all or some of the thrasks in the system. The thrask list must be updated in response to user actions, even when the user actions occur on the second viewing pane (P2) which displays an item list of a selected thrask.

The thrask list module 308 also aggregates or abstracts from the display representation of certain information of all information items in a thrask. The aggregate or abstraction is a composite representation of that certain information about the thrask as a whole. For example, if a given thrask has ten information items and each of the ten has a "ball" representing an obligation, as can be seen in the second viewing pane, the thrask list module 308 aggregates the ten balls together and draws a small display of the aggregate in the first viewing pane in the proximity of the thrask in question.

The item list module 310 manages a screen area referred to as the second viewing pane (P2). The item list module 310 controls the display of and user interaction with the list of information items visible to the user within a selected thrask. For example, if a thrask has one message, one link, and two other documents in it, the item list module 310 manages the (in one embodiment) four elements of the second viewing pane that represent these four items. The elements may be graphically represented in any number of ways; e.g., row elements in a list (FIG. 14), or icon elements in a group, or a pop-up menu view of a list, or a separate list to one side (such as thrask resources in FIG. 15).

The notification module 312 is the center of coordination within TaskMaster. The notification module 312 receives notifications of logical events that have occurred in the system and coordinates the system response, usually through other modules. These logical events are not trivial events, such as a "mouse has moved" event, but important events representing a change in status of mail, other items, or metadata (including temporal triggers) handled by TaskMaster such as a "new mail has arrived" event. For example, if a thrask is selected by the user in the first viewing pane P1, the thrask list module 308 can act to highlight a new thrask, update appropriate parts of P1, etc., then the thrask list module 308 calls the notification module with the event "new thrask selected". At this point, the responsibility of the thrask list module 308 with respect to this event is completed. The notification module 312 then coordinates with the item list module 310 to put the appropriate new thrask content in the second viewing pane P2 for the thrask that is now selected in P1, and to select an item in P2 so that the user has a selected item for action.

The content preview module 314 manages the screen area referred to as the third viewing pane P3. When a message is selected in P2, the content preview module 314 displays the text of the selected message then informs the notification module 312 that the message should now be marked as "read" (or "seen"). The content preview module 314 also includes logic to display other types of information items such as the contents of links (URLs) and other types of documents, or an error message if the content cannot be displayed.

The system, TaskMaster, is event-driven. It acts only in response to events from one of three sources. The primary source is the user. A user action such as pressing a mouse button with the pointer over a button on the screen is considered an "event" that must be responded to by TaskMaster. The second source of events is Outlook, such as when Outlook notifies TaskMaster that new mail has arrived. The third source of events is a clock, such as when the day changes and the system must update displays based on the new current date. These clock events are periodic, but they are handled similarly to the other two types.

FIGS. 4 through 8 illustrate how TaskMaster responds to some particular events. These illustrations have been simplified for clarity. In practice, TaskMaster responds to dozens of events and these events are generally at a much lower level.

Figure 4:
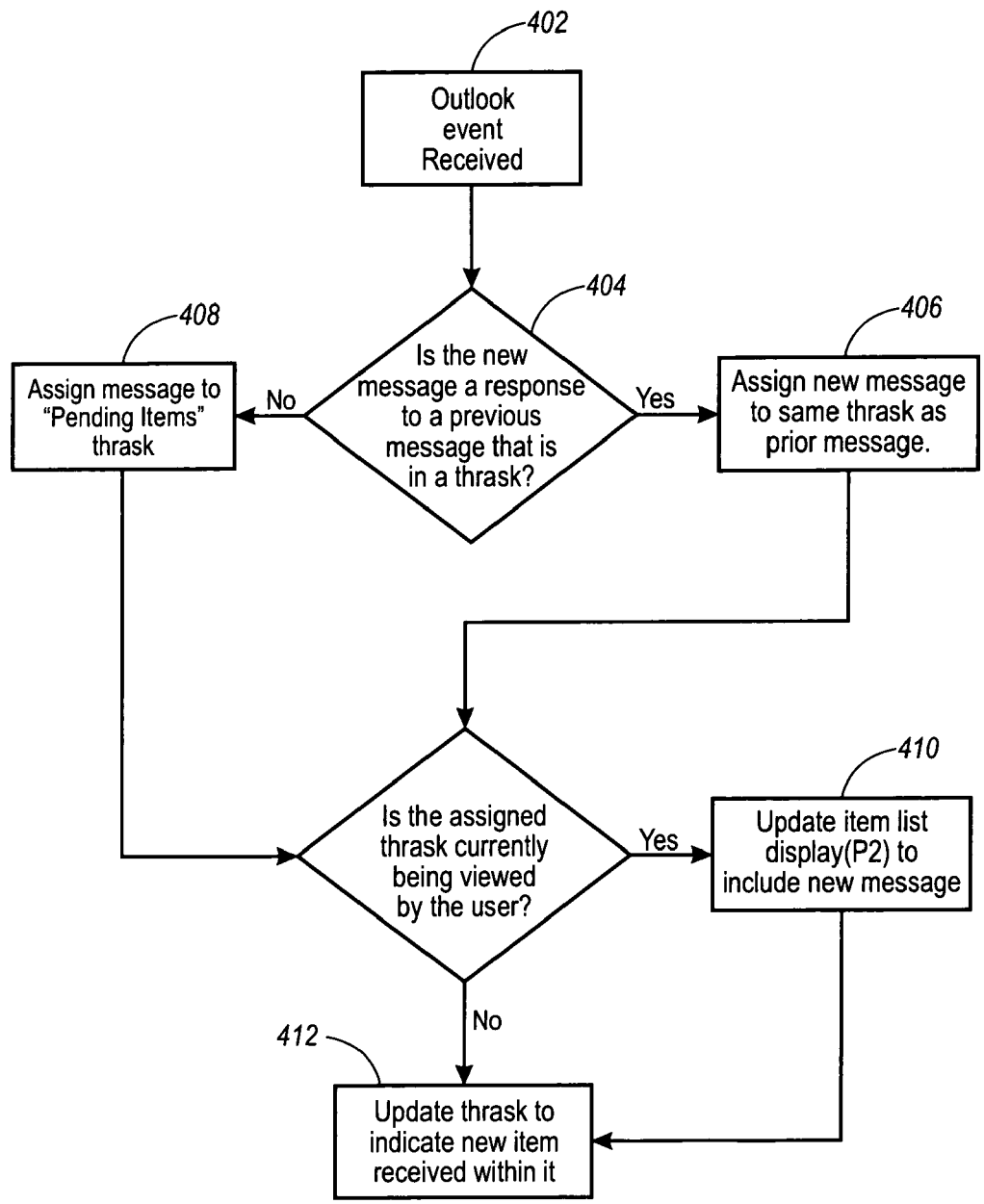
FIG. 4 shows how TaskMaster responds to the Outlook event "new mail arrived in user's inbox".

FIG. 4 shows how TaskMaster responds to the Outlook event "new mail arrived in user's inbox". TaskMaster receives the Outlook event and copies the new mail message into the system (block 402), then checks whether the new message is a response to a previous message that is in a thrask (block 404). If it is, then TaskMaster assigns the new message to the same thrask as the previous message (block 406). If it is not, TaskMaster assigns the new message to a default thrask called "Pending Items" thrask (block 408). If the assigned thrask is being viewed by the user, then TaskMaster updates the item list display (P2) to include the new message (block 410) and updates the thrask to indicate that a new item has been received within it (block 412). Otherwise, TaskMaster only updates the thrask (block 412).

Figure 5:
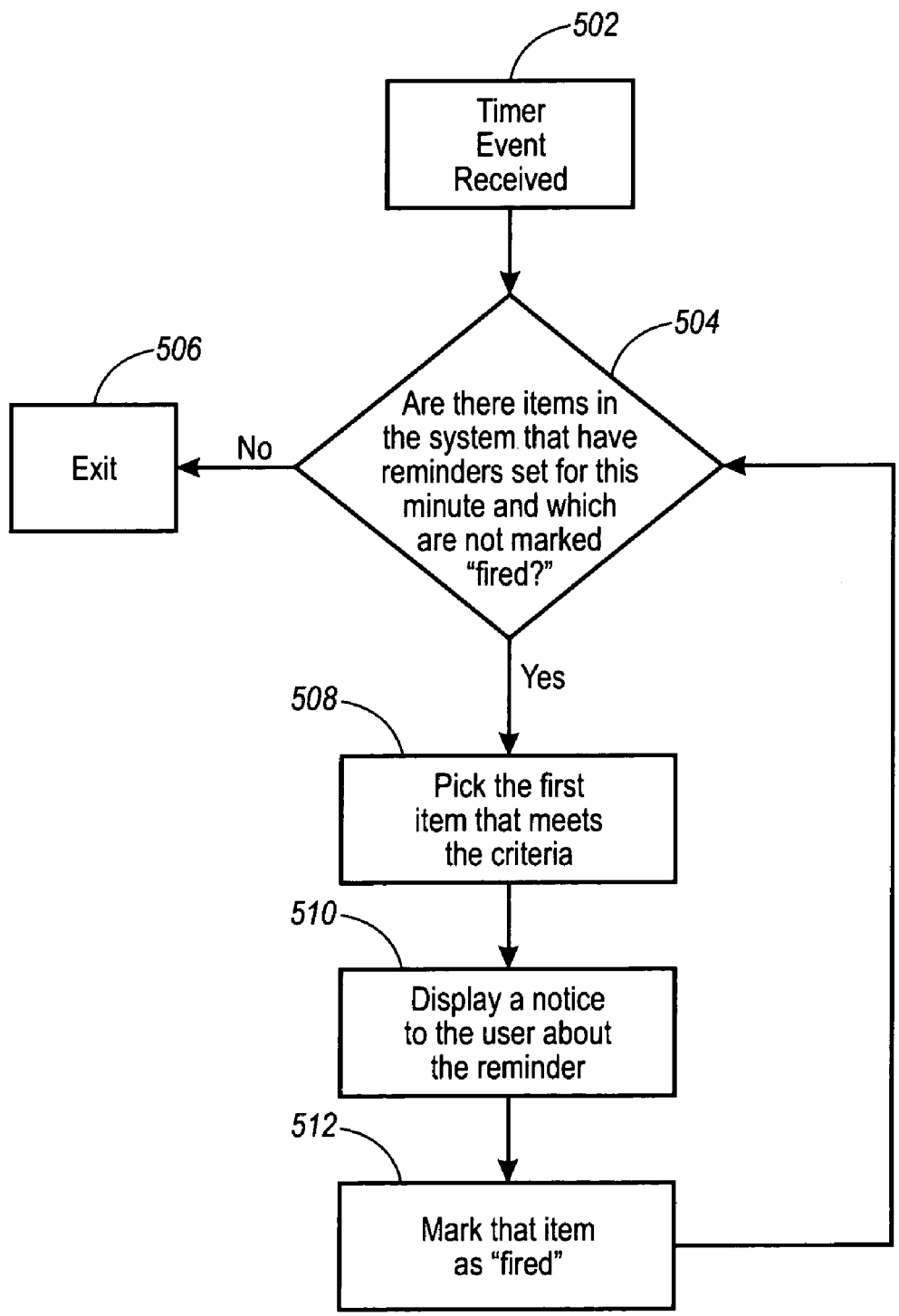
FIG. 5 shows how TaskMaster responds to the clock event "current minute has changed".

FIG. 5 shows how TaskMaster responds to the clock event "current minute has changed". TaskMaster receives the clock event (block 502). TaskMaster checks to see if there are any items in the system that have reminders set to go off at this minute (or at any prior minute, e.g., when the application starts up after some interval) and which are not marked "fired" (block 504). If there is none TaskMaster exits. If there are such items, TaskMaster picks the first item that meets the criteria (block 508), displays a dialog box with the reminder information to the user (block 510), marks that item as "fired" (block 512) then goes back to block 504 to check if there are any other such items.

Figure 6:
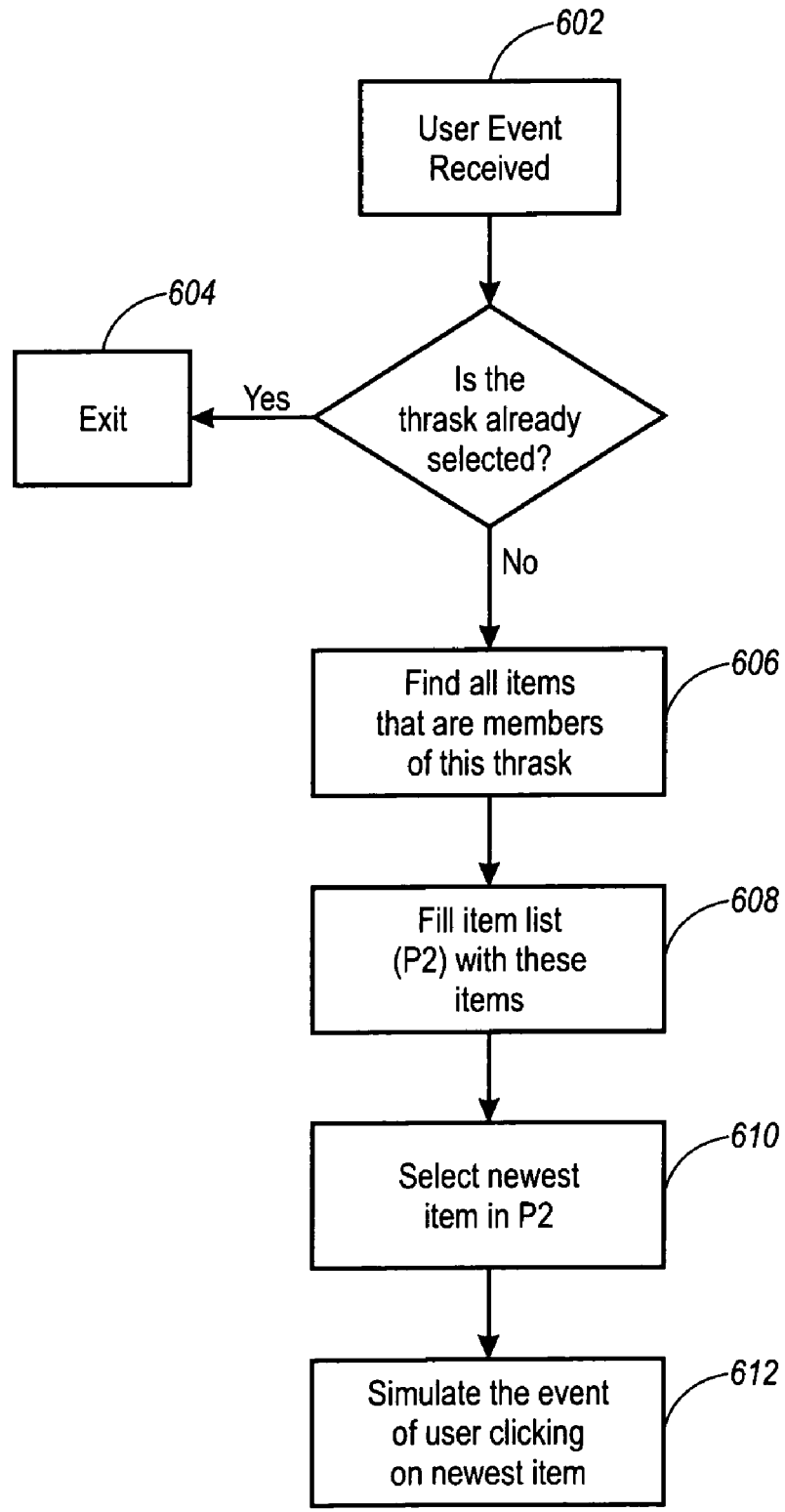
FIG. 6 shows how TaskMaster responds to the user event "user clicks on a thrask".

FIG. 6 shows how TaskMaster responds to the user event "user clicks on a thrask". TaskMaster receives the user event (block 602). If this thrask is already selected, TaskMaster exits (block 604). If the thrask is not already selected, TaskMaster finds all items that are marked as members of the thrask (block 606), fills the item list pane P2 with these items (block 608), selects the newest item in P2 (block 610) and simulates the event of user clicking on the newest item (block 612).

Figure 7:
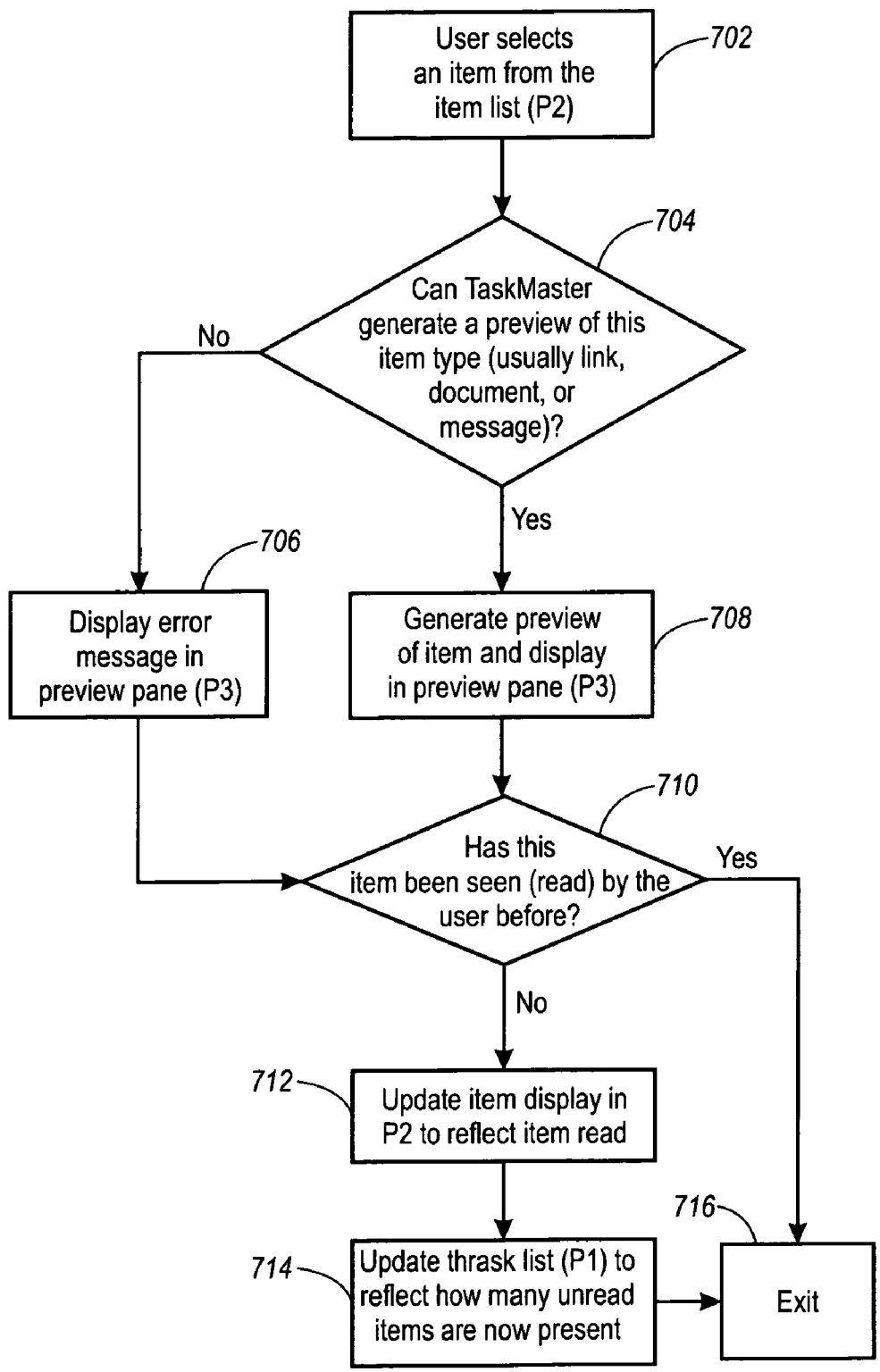
FIG. 7 shows how TaskMaster responds to the user event "user clicks on an item".

FIG. 7 shows how TaskMaster responds to the user event "user clicks on an item". TaskMaster receives the user event (block 702). TaskMaster checks to see if TaskMaster can generate a preview of this item type (message, link or other document) (block 704). If no, TaskMaster displays an error message in the content preview pane P3 (block 706) then goes to block 710. If yes, TaskMaster generates a preview of the item and display it in the content preview pane P3 (block 708). TaskMaster checks whether this item has been read before by the user (block 710). If it has been read before, then TaskMaster exits (block 716). Otherwise, TaskMaster updates item display in P2 to reflect that this item has been read (block 712), then updates the thrask list displayed in P1 to reflect how many unread items are now present (block 714), then exits (block 716).

Figure 8:
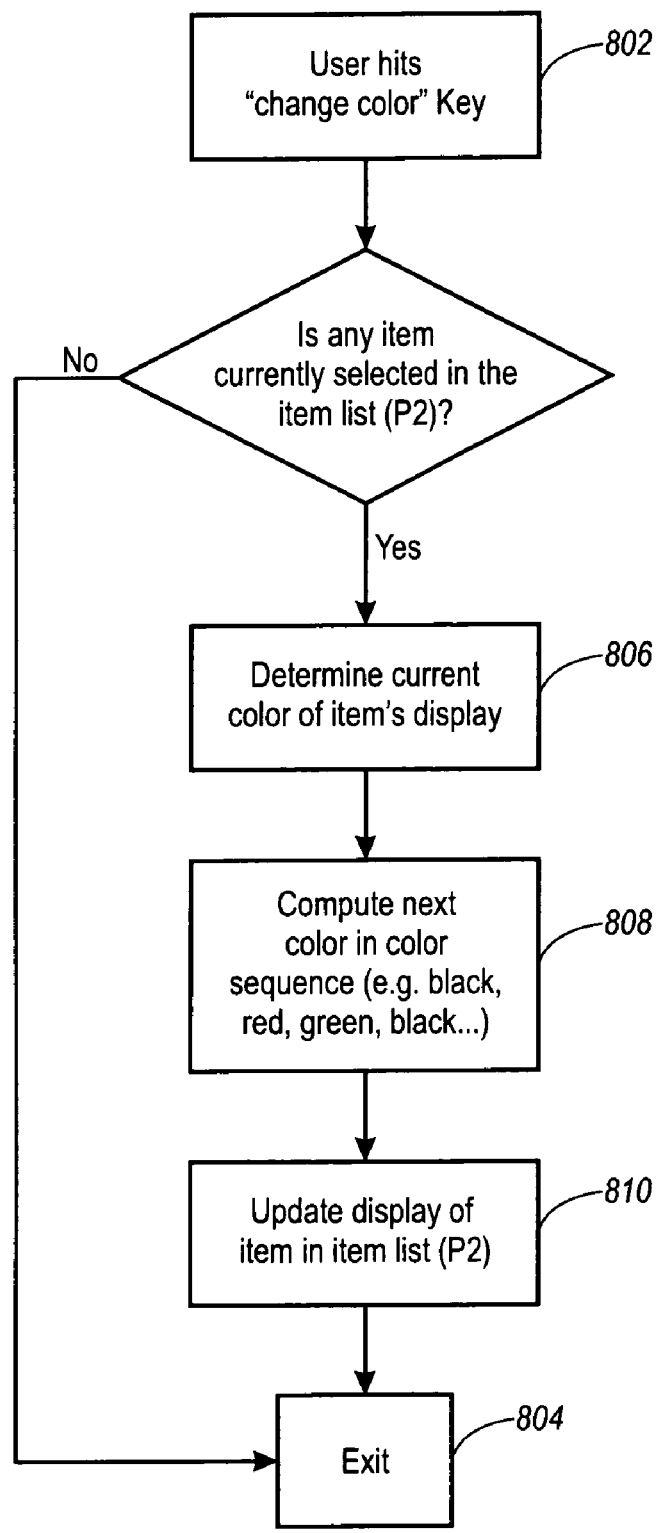
FIG. 8 shows how TaskMaster responds to the user event "user hits the change color" key on the keyboard.

FIG. 8 shows how TaskMaster responds to the user event "user hits the "change color" key on the keyboard. TaskMaster receives the user event (block 802). If there is no item currently selected in the item list pane P2, TaskMaster exits (block 804). If there is a currently selected item, TaskMaster determines the current color of the item's display (block 806), then computes the next color in the color sequence (block 808), then updates the display of item in the item list pane P2 (block 810). TaskMaster also notes the change of color for the selected item in the database so that this new color will be seen when this item is displayed again later. TaskMaster then exits (block 804).

Figure 9:
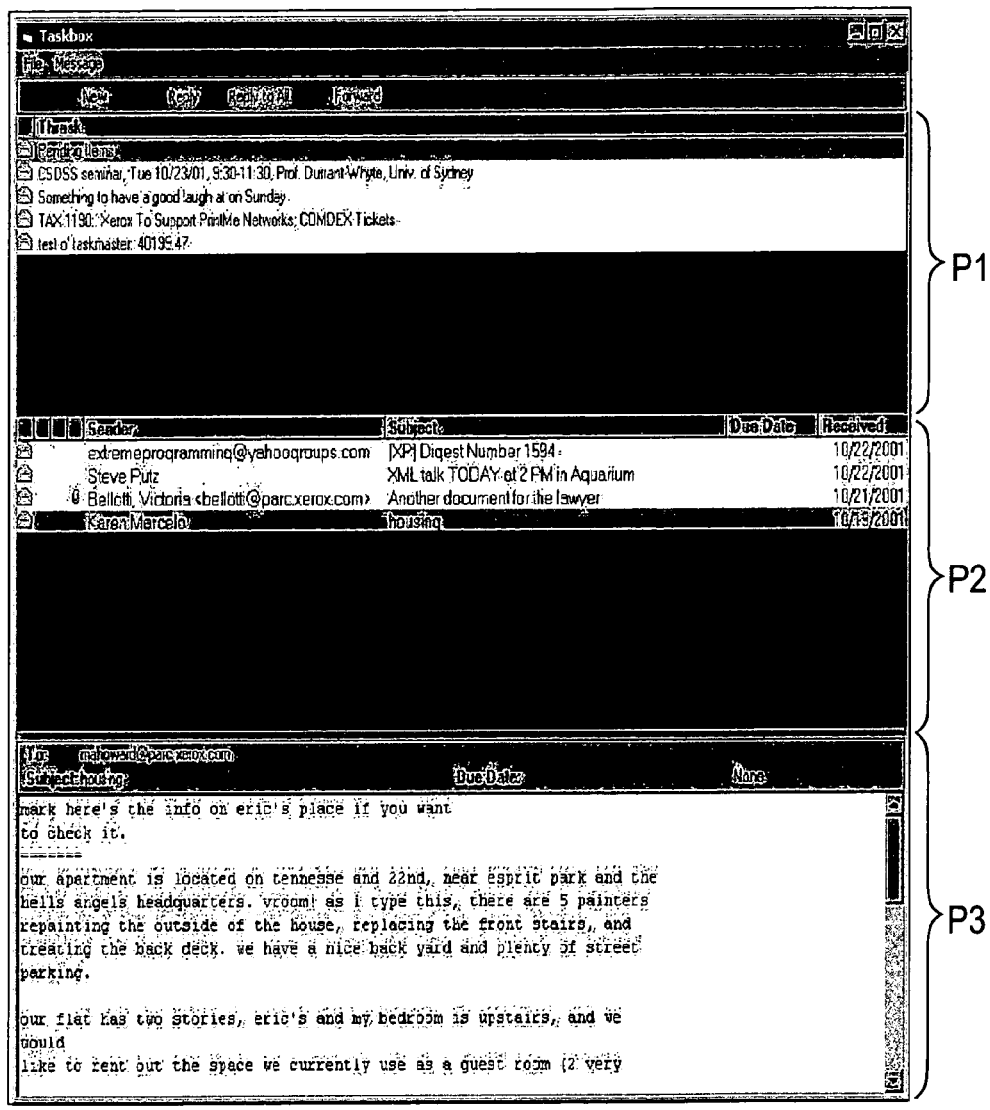
FIG. 9 is an exemplary appearance of an embodiment of the TaskMaster.

FIG. 9 is an exemplary appearance of an embodiment of TaskMaster. In this embodiment, the TaskMaster viewer includes three viewing panes P1, P2, P3. The thrask list is displayed in P1. The items within the currently selected thrask "Pending Items" (mail messages, notes, phone call records, documents and links) are shown in P2. The content of the selected item having as subject "housing" is displayed in the content preview pane P3.

The thrask list pane (P1) of TaskMaster is where Alice, the canonical TaskMaster user, can see all of the thrasks that she is tracking. Each thrask contains a list of filtered incoming email, documents (as attachments or otherwise included), links, notes and so on.

FIG. 10 shows a different design embodiment for the thrask list pane P1 which includes additional features.

Column 1 (counting from left to right) of pane P1 shows whether there are unopened messages in a thrask. The blue square means all items have been opened, and the black square means there is one or more that has not been opened.

Column 2 of pane 1 with header "Title" shows the titles of the thrasks. In an exemplary implementation, thrasks are ordered by Title alphabetically by default, but users can drag a thrask to the top of the list (before the first thrask) where it is pinned in order of where it is placed (as long as it is above the first alphabetically sorted item). Pinning is drag operation that causes a pin icon to appear showing the thrask is fixed in place; the pin can be clicked to un-pin the thrask from its position at the top of the list.

Column 2 of pane P1 also shows the Options. An "arrow tip" symbol indicates that there are useful options associated with a thrask. The useful options are accessible from a pop-up widget such as a menu by clicking the arrow tip symbol.

Column 3 of pane P1, having header "Due", gives warnings, for example, of upcoming deadlines, reminders and thrask expiry.

Column 4 of pane P1, having header "Balls", indicates whether there are individual items within the thrask where there is some outstanding obligation. Whose court the ball is in is indicated by the color (red for my obligation, blue for others' obligations).

Column 5, having header "Most Recent Sender", shows the sender of the most recent item that arrived in the thrask (either by automatic TaskMaster filtering or by user action, e.g., the user can drag items from P2 to thrasks in P1). Note that if the user has included an item into a thrask that was not sent in email, either via a menu option or by drag-and-drop into P2, then no sender would be displayed in that item's cell in this column.

Column 6, having header "Date" shows the date the most recent item was added to the thrask (widening this column by dragging the column bar would also display the time).

Column 7 having header "Notes" shows handy notes of which the first few words are visible in P1 as a reminder. The notes can be opened by clicking on them.

The bar on the right, in column 8, is a special scrollbar. More discussion about this scrollbar will be provided later.

The first thrask shown in P1 is the default thrask "Incoming New Items" (also called "Pending Items" as shown in FIG. 9). TaskMaster puts all new incoming items that are not automatically filtered into other thrasks into this default thrask. In this way, the default thrask resembles a traditional email client's inbox. By selecting this default thrask, user Alice can view items in the item list pane P2, which she can manually add to existing thrasks, or otherwise process and delete.

In another embodiment of TaskMaster, the Pending Items thrask might look like a typical mail client's in-box, such as that of Outlook. Thus, items in this list might also be all incoming content (unless deleted or filed elsewhere) with some items duplicated (rather than moved) into thrasks, for example, by the mail handling module 306 described in FIG. 3.

Figure 11:
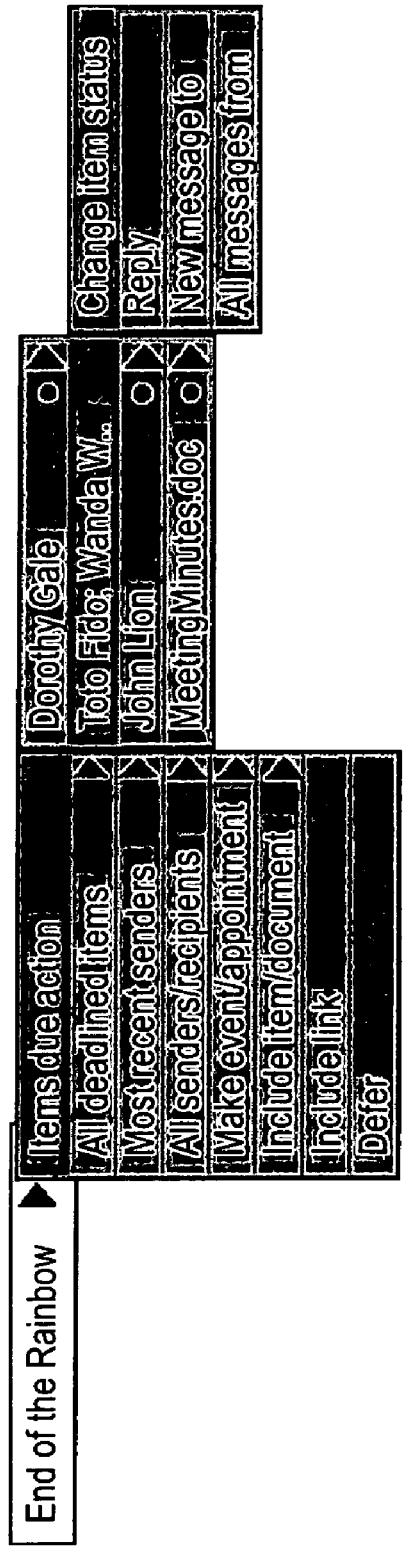
FIG. 11 shows examples of menu options available for a thrask in P1.

FIG. 11 shows examples of a menu of useful options available for a thrask in P1 under the heading "Options." The exemplary thrask as shown in FIG. 11 is entitled "End of the Rainbow". In FIG. 11, the currently selected item "Items due action" takes the user, via cascading sub-menus to a message item with multiple recipients (Toto Fido; Wanda Witch . . . etc.) to edit metadata such as deadlines, reminders, action balls, etc., by selecting "Change item status." The user might also select a template reply, or a new message template and so on. Other useful options are listed in the figure, but this collection is merely meant to suggestively illustrate the kinds of useful task-oriented information management and action options that one might wish to associate closely with a thrask.

Users may wish to have an overview of the location of certain content. The scrollbar in the rightmost column of the thrask list pane P1 (FIG. 10) can be used as a kind of overview list viewer highlighting where to look for, say, new information (though it could be for important information or the results of a search, and it could be toggled to show different things highlighted in different states; e.g., a blue background when it is highlighting the location of unread items, and a pink background when it is highlighting the location of important messages; etc). The scrollbar represents everything within the entire length of the list and the location of the new content relative to the length of the list is indicated by black bars. As the list gets longer, the lines will get narrower and gray may need to be used for single important items with black only being used to represent clumps of important items. The nature of one embodiment of TaskMaster, with items timing out automatically, means that this list should never get too long for this graphic to work effectively.

This representation does not have to be in a scrollbar. It could be an additional viewer with no control implications. However, the scrollbar is a more efficient blend of utility. In FIG. 10, the overview scrollbar is on the right, showing the slider in red at the very top, which encompasses the currently viewed part of the thrask list with two new items in it. Wider bars represent clumps of new, unread or important items.

In one implementation of the TaskMaster system, upcoming due deadlines, reminders and automatic removal of a thrask from the system are indicated to the user in the "Due" column of P1 (FIG. 10). By thrask removal it is meant that if a thrask is unused for a while, for example, it, and all its items might eventually 'expire' and be removed from the display capabilities of P1, P2 and P3. This would most likely be after the last deadline in the thrask has expired.

In one implementation, to the left (right in FIG. 10) of each item's subject line in the thrask list, three horizontal bars of about 3–6 pixels in height and about 10–60 pixels in length which represent perhaps a span of two-weeks into the future each are displayed. As the nearest deadline or reminder associated with one of the items in the thrask, or the thrask's entire removal approaches, the bars change color at one end from white to some color and the color change progresses along the bar until it has completely changed color and the deadline/reminder/removal occurs. Once this date passes, or the user changes the settings in the relevant thrask items, the bars will reset to reflect the recalculated nearest deadlines or reminders upcoming or the reset removal date. Users would be able to sort by these properties by clicking on the top of the column to toggle between which property to use to order the content of the thrask list.

Figure 12:
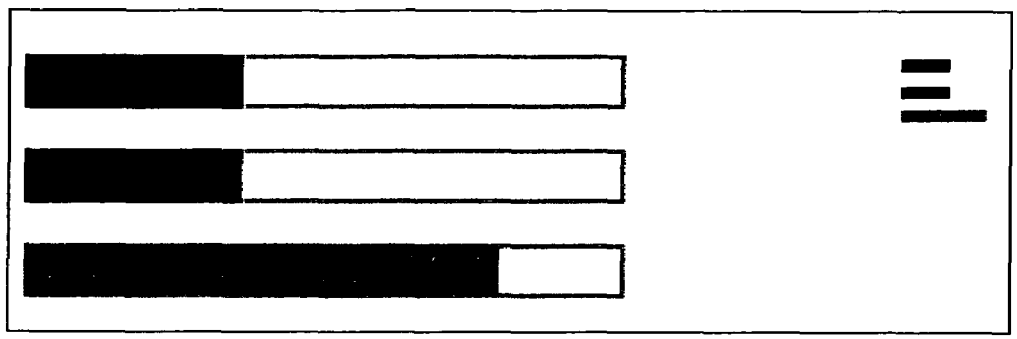
FIG. 12 shows enlarged and normal views of approaching deadline warning bars.

FIG. 12 shows enlarged and normal views of warning bars. These three bars could be displayed to the right of each thrask name in the thrask list pane P1 (FIG. 10), to show the nearest upcoming deadline and reminder and imminent removal from TaskMaster's store of thrasks. Here the upcoming deadline is shown as dark blue at the top, the reminder is shown as medium blue in the middle, and the impending removal is shown as light blue at the bottom. This warning bars display is an abstraction of the items of the thrask. Since the system only indicates the "nearest upcoming"deadline or reminder with one of the bars, other deadlines and reminders associated with other items in the thrask are not visible in this embodiment. However, an alternative embodiment could show more deadlines and reminders than only the nearest, or indicate upcoming deadlines only and not reminders.

Users need to keep track of obligations that they must fulfill and that others owe to them. In one implementation, in P3, and in another implementation in P2, there is a button that a user can press on selected items such as documents or messages inside their thrasks to toggle from a null default to represent whose court the ball is currently in (an obligation represented by a red ball for my action or a blue ball for someone else's action). This results in the item being displayed where it is listed, either in P2 or as the most recently sent item in P1 with an appropriately colored ball. In P1 an aggregate display of these actions; a literal display of "balls" appearing from top left to right, line by line, that builds up to some limit for each thrask can be shown. The balls in the aggregate are very small, just a 2–3 pixels in diameter. The user's color perception will be adequate to detect the balls, and an effect of cumulative obligations building up with balls being added can be achieved. Again, a user would be able to sort the thrasks in the thrask list by one of these properties by clicking on the top of the column "Balls" and selecting the property. The user may also click on the aggregate display of the balls themselves in the Due column in P1 at the thrask level to see a list of the names of people associated with each action ball and useful menu options (similar to those shown in FIG. 11) such as view their last message on this action, or reply to their last message.

The user may assign actions to an item in P2 (FIG. 14) without even opening it by clicking on a button on the same line as the item in the list view in pane P2 to toggle from the default "no action" state to "my action" and then to "other's action."

Referring to FIG. 11, multiple message sender/recipients may be associated with an action ball, since the action is attached to the message item not to the individual sender or recipient. The user's own name may never need to be included as all her email has her name on it as a sender or recipient. Some messages have multiple people as recipients, so which one is actually due for an action cannot be specified. However, the user will most likely be able to retrieve enough context information from the message to figure this out quite easily. However, an advanced embodiment of TaskMaster may offer a means to assign an individual, identified by their email address with a specific action ball (e.g., via a menu accessible from clicking on their email address) and may allow multiple action balls to be assigned to a single item.

It is noted that in FIG. 11, action balls can be associated with documents or other items other than messages. Since there is no recipient/sender list, the name of the document (e.g., MeetingMinutes.doc) is included in the options menu shown. An advanced embodiment of TaskMaster will allow the user to associate a name and email address with the non-message item, in this case the name will be represented.

Figure 13:
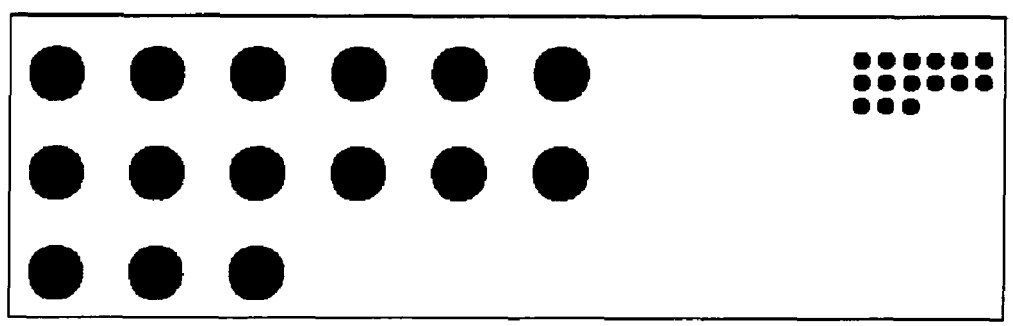
FIG. 13 shows enlarged and normal views of the balls (actions) in the user's court (red) versus those in other people's (blue) as seen in the thrask list pane P1.

FIG. 13 shows enlarged and normal views of the obligation indicators for balls in the user's court (red) versus those in other people's (blue) as seen in the thrask list pane P1. In FIG. 13, there are eight red balls and seven blue balls. The main interest for the user is things that need to be done (balls building up as a visual gestalt). The secondary interest is how many must she do versus how much following up with others does she need to do? (the main color of the collection of balls gives the user a sense of whether it is herself or other people that have the obligations). These balls are shown to the right of each pending item's subject line in P1.

FIGS. 14 and 15 show two embodiments of the item list pane P2. When a user clicks on a thrask in P1, the display in P2 is updated to show the items in the selected thrask and related information.

Referring to FIG. 14, column 1410 with the "question mark" icon header shows what kind of item is listed. A mail message is indicated by a "letter" icon 1401, a phone call by a "telephone" icon 1402, a note by a "note" icon 1403, a document by a "document" icon 1404, and a web link by a "web" icon 1405.

Column 1420 is the related documents column. This column shows which messages have attachments and which items are or have been attached to enclosing messages. Clicking on the "this is a related or an attached or enclosed document or link"icon 1422 (two rectangular shapes overlayed) and "this message has attachments" (paperclips) icons 1421 in column 1420 retrieves related items (e.g., enclosing messages or other versions of the same document) and attachments respectively. This is needed because the user may have deleted or moved the related document or enclosure in TaskMaster. If the user has deleted a related item from TaskMaster and Outlook altogether making it unretrievable, the icon is greyed, as shown for the second item from the top. Clicking on the "versions" icon (two curved arrows in a circular formation; which only appears next to documents) retrieves previous versions of the same document (in FIG. 14, the second item from the top is a version, but the grayed document item indicates that related versions have been irretrievably deleted).

Column 3 of P2, having header "Sender", shows the sender of the item. If the sender is oneself, the name is shown in gray, as it is not important information. It is noted that Alice can either send items to herself through emailing them (in which case they appear in Outlook too), or else she can save items in TaskMaster only, making these items the only copy. If they have not been archived in Outlook, items appear in red (like the fourth item from the top). If Alice tries to delete such an item, she is warned she is about to delete the only copy and is given the chance to archive it in Outlook as a message or an attachment.

Column 4, having header "Subject", shows the subject line of the message. However in TaskMaster, the user can edit this to be more meaningful than typical subject lines often are.

The header "Options", also in column 5, indicates that there are options associated with messages by clicking on the "arrowhead" icon.

Column 5, having header "Arrived" indicates the dates and times that items arrived in TaskMaster.

Column 6, having header "Due", indicates that there is a deadline (clock icon) and or a reminder (bell icon) associated with an item (every item can have neither, either or both of these set by the user by opening the item itself or by interacting with buttons in the content preview pane P3). If Alice clicks on the clock icon, she will see the deadline. If she clicks on the bell icon, she will see the reminder date.

Column 7 indicates whose court the ball is in (whose obligation it is) on this particular item. Clicking in this column will toggle the state of the action ball from none (white) to mine (red) to someone else's (blue) and back to none.

Column 8, having header "Slicky Notes" is for holding handy notes. TaskMaster provides a mechanism that allows the user to attach a handy note to an item (which can also be a note), the first few words of which can be read from P2. Opening an item with a slicky note shows the note in the item's window. The note slides over the contents (hence the term slicky, because they seem to slide) if they are scrolled, to remain visible at all times.

FIG. 15 shows another embodiment where documents and links are associated with, rather than included in the list of TaskMaster items. Here a calendar is also embodied in the thrask as an additional resource. The resources associated with the thrask are separated out from the TaskMaster items, but are visible while viewing the messages in the thrask. These "Thrask Resources" and "Calendar" might be displayed as lists, collections of icons, or as a pop-up display(s) only in various embodiments of the invention.

As some thrasks or individual items relate to things that are not due to become active for months, such as preparations for an upcoming conference after an initial email notice about the conference, users can defer them. Assume Alice gets a notification in March for a conference taking place in October. She can create a thrask from this item by dragging it into P1 from P2. She can then click on the Options menu and choose "Defer" (FIG. 11). Defer is a separate timed property from deadline, reminder or thrask expiry date. A dialog box will open allowing Alice to pick a date for this thrask to come back into P1 (with some suitable highlighting). Should another message arrive in this thrask in the interim, the thrask will reappear, but it can be deferred once more in the same manner. A similar set of behaviors could be applied to individual items within a thrask or in the "Incoming New Items" default thrask (FIG. 10) such as messages, documents, notes and so on.

Phone messages are conceptually different for users so a special kind of property can be defined for a note in TaskMaster to indicate that it refers to a phone call or voicemail. Information on whether the call is incoming or outgoing can also be included.

A single click versus a double click on different specific parts of a thrask listing in P1 could reveal different views of the thrask, or "Incoming New Items" collection content, for example, the single click function in the left-most area may be assigned to toggle P2 between being displayed as shown in FIG. 14 or FIG. 15. A double click may be associated with displaying only items with deadlines in the order in which they will arrive. Alternatively, double clicking could be associated with displaying deferred items, which are normally hidden.

It is desirable that the user be able to associate date and time and title and location with an item and have it be passed to Microsoft Outlook's calendar. In FIG. 15, an alternative solution is shown, which is to have a special calendar inside each thrask where calendar-related items can be moved or copied and inspected via a date-based viewer. This viewer could stand in relation to Outlook's calendar in the same way that TaskMaster stands in relation to Outlook's message folders, mirroring calendar entries created in either Outlook or TaskMaster.

It is also desirable that the user be able to add a message to Outlook contacts and have the right thing happen (i.e., new contact(s) for the sender and/or recipient(s) other than this instance of TaskMaster's user are created). An alternative solution would be to have a contact list for each thrask and a master contact list that would contain all contacts across all thrasks, and or contacts not associated with any particular thrasks (once again, these might mirror Outlook's own contact list feature).

Users will sometimes get a reminder from TaskMaster regarding an item that happens to have an obligation (action ball) for someone else (represented as a blue ball) associated with it. In this case, the reminder dialog box should include a button for the user to click to generate a message to that person containing the body of the message with the action ball associated with it.

The user never has to open any item in TaskMaster to deal with it because the item list pane P2 will have buttons for all individual item-related functions at the top. However, should users wish to open items, only email messages, which are displayed by TaskMaster may still have these functions as buttons. Other items may be opened by Microsoft Office applications such as Word, PowerPoint and Excel. However, in an advanced embodiment of TaskMaster, all productivity applications' documents can be opened within TaskMaster and maintain their function buttons and metadata state records, which would be tracked by TaskMaster.

In another embodiment of TaskMaster the Incoming New Items thrask may behave very like an email client inbox, as in Outlook, with all incoming content listed there, unless moved or deleted (usually, modern mail clients have something equivalent to P1 and P3). When the user clicks on an item that has been thrasked, P2 would appear between (or in some other configuration such as a side bar or separate window) P1 and P3 and the system would behave as described above.

TaskMaster can be made to recognize meta-information inside documents through a template mechanism. Commands or instructions may be contained in a Word file, an Internet shortcut file, text file, .csv file, or any other type of file which can be configured to provide information to the technology that a desired computation or function is to be performed.

Figure 18:
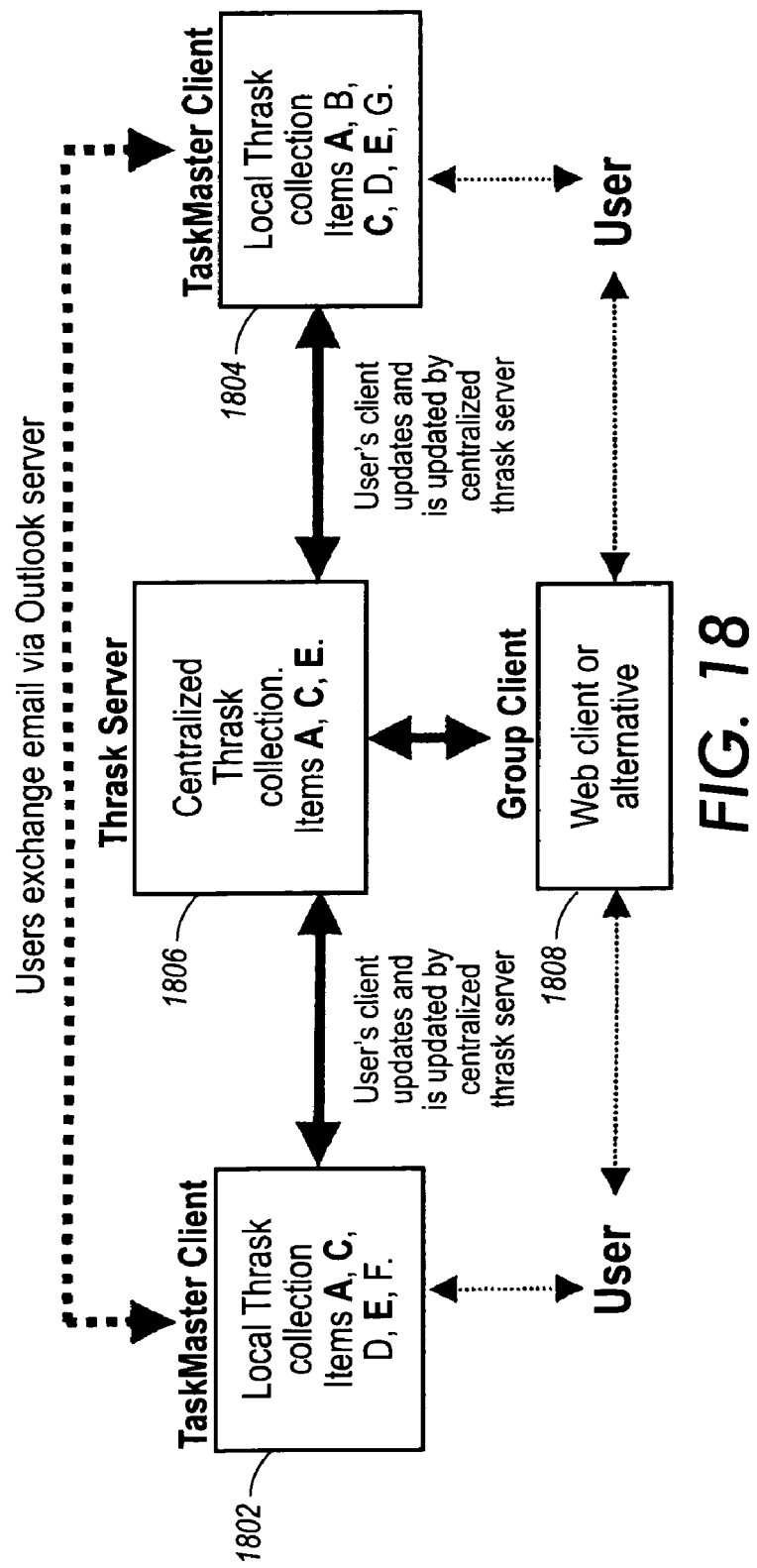
FIG. 18 shows an exemplary schematic of a workflow-enhanced architecture for TaskMaster.

Such information is customized for the TaskMaster client, (or possibly for a central server as shown in FIG. 18) to interpret and act upon. Thus, there can be different kinds of notes that TaskMaster would recognize, such as: phone notes, with a phone icon; agendas, with a list of people to copy them to; or contacts that might be automatically organized into a special contacts-thrask.

Figure 16:
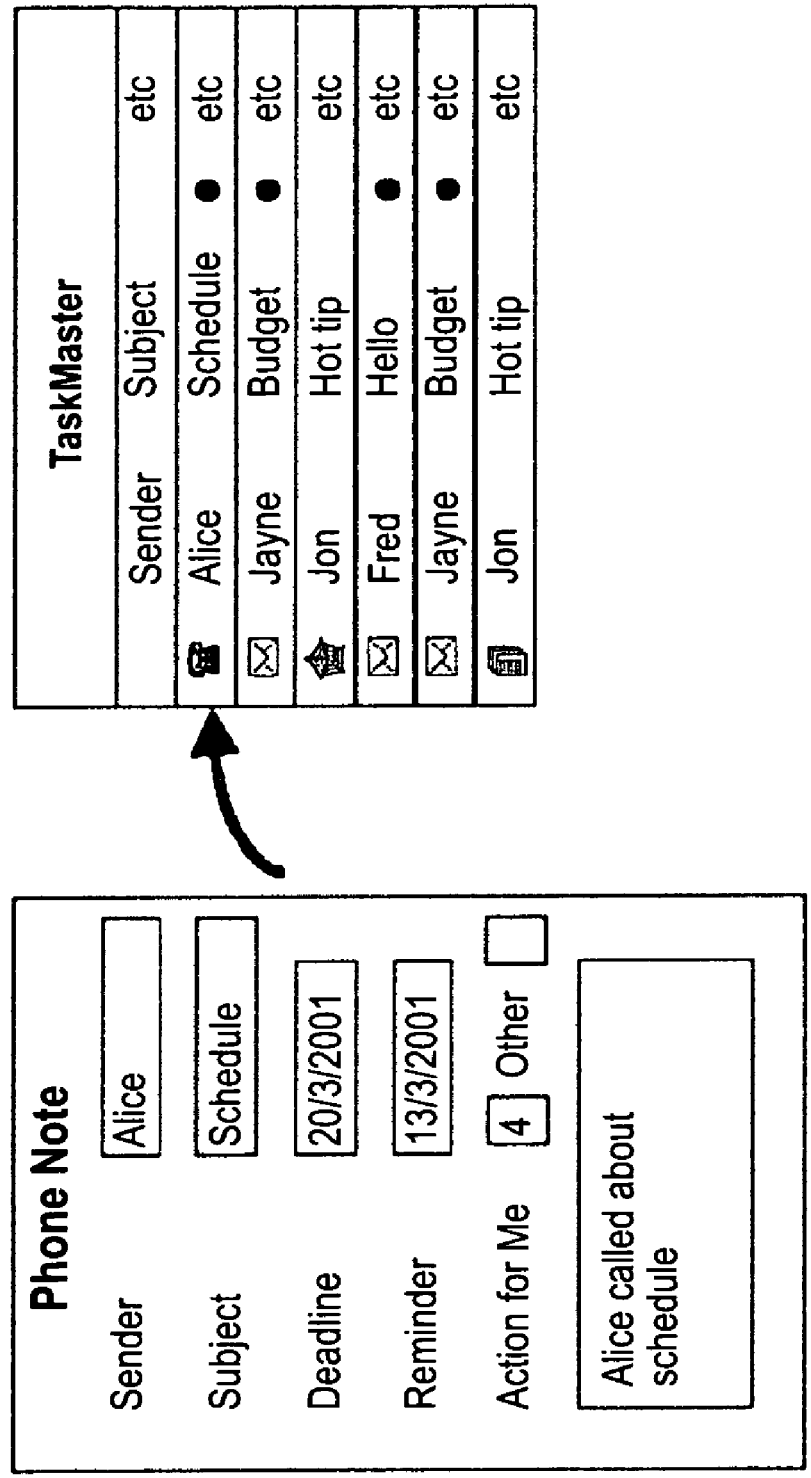
FIG. 16 is an exemplary depiction of an item template mechanism.

FIG. 16 is an exemplary depiction of the template mechanism. Templates normally exist as icons or shortcuts on the desktop or in a folder. The user may click on such a shortcut and then create a copy to fill in. The user drags this to TaskMaster where it is displayed appropriately according to its template type and how it has been filled in. Other computation may be possible based on template type, or the manner in which fields are filled in, e.g., "copy to [name]" (where the user fills in a name between the square brackets).

In TaskMaster, action balls are used to represent when someone must pursue an action. When an action deadline or reminder comes due, it is quite likely that the user will want to follow up by communicating in some way with someone about the TaskMaster item to which the action is bound; or the user may want to deal with the item in some way that the system can anticipate. Thus, when a deadline or reminder is passed in the system, it should trigger a pop-up dialog box as shown in FIG. 17.

Figure 17:
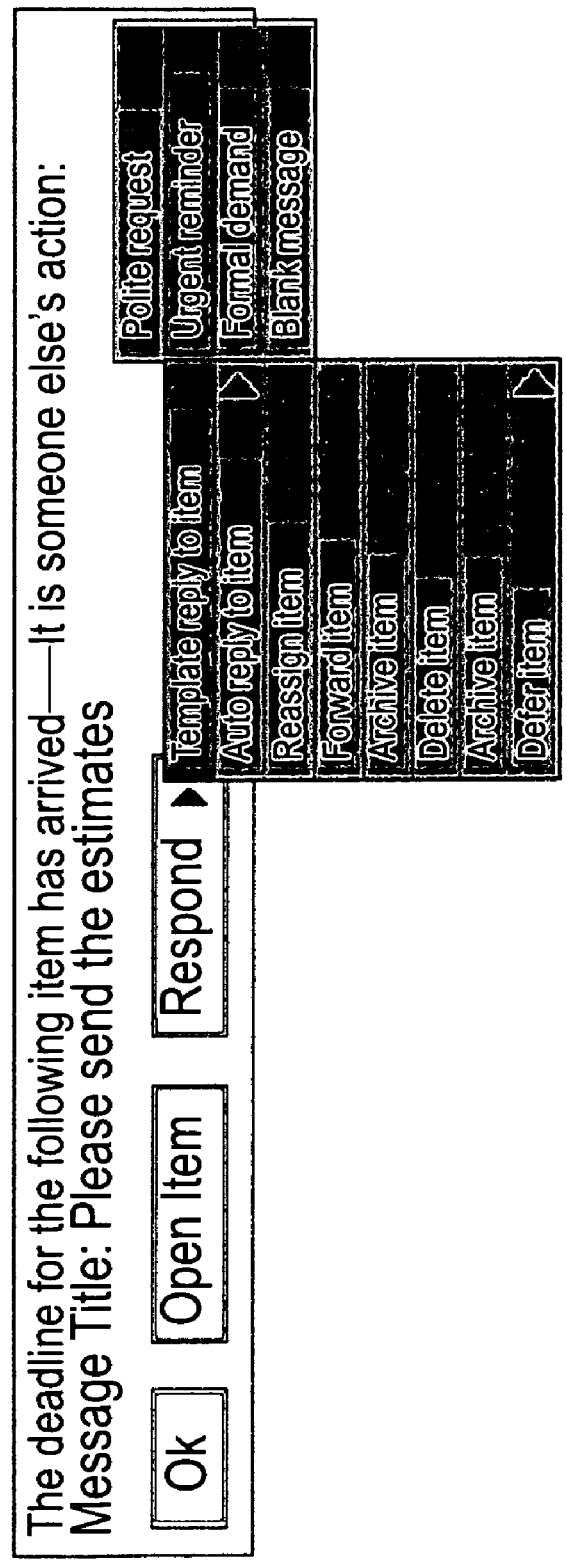
FIG. 17 shows the pop-up dialog box that appears when a deadline or reminder has passed in the system.

In FIG. 17, the pop-up dialog box shows that an action for someone else is due. There are some possible useful response options available to the user when an action item for someone else passes a reminder date or a deadline. In this case, the deadline has arrived, and the user can dismiss the dialog box by clicking the OK button, open the item itself to consult it, or choose an item from the Respond menu. These are just some examples of the kinds of useful response options that TaskMaster may offer.

TaskMaster also has semi-automatic Ball-in-court management. When Alice has set a ball-in-court on an item, any reply to the item will cause a special alert box notification to be sent to Alice regarding whether TaskMaster should cancel the ball or change its status. For example, a special alert box notification might notify Alice that Dorothy has responded to an action ball with a message, show the subject of the message and provide Alice with options. Alice could dismiss the notice by clicking the Dismiss button, or open the message, by clicking the Open button and change the action ball setting from within the message if need be. Dorothy need not be a TaskMaster user for this to work, nor need Dorothy and Alice share any data that would not normally be exchanged by their messaging systems.

If Dorothy were also TaskMaster user and an embodiment (described later) permitted the sharing of items in thrasks and thus obligation tokens (balls), Dorothy could cancel the item from her own TaskMaster client by various means including clicking on the ball icon itself, which would toggle it from red (my action) to blue (other's action) to white (no action). In this case, if Dorothy leaves the action ball red or changes it to be blue, the next message in the same thrask from Dorothy to Alice or from Alice to Dorothy would cause the dialog box to reappear showing the new state of the action.

In TaskMaster, email is characterized as a work habitat not just a messaging application. Thus file and link management is embedded in the email client. By this, it is meant that users can browse collections of email together with notes, other document types and links, which may or may not have been transmitted as email attachments. These information items may have been added to the collection by the user, who may move or copy items from their own hard drive or off another networked machine. These other items are viewed as first class citizens in the email viewer (rather than their presence being hinted at using some attachment icon with the item itself only properly accessible and identifiable by opening the message as is currently the case in most email tools). Thus, in Taskmaster it is possible for the user to see the type, identity and age of these other items in the messaging system client's viewer, just as the user can with messages, without having to open messages, as is presently the case with attachments.

In TaskMaster, each user-defined activity thread, and not the email message, is the primary unit of interest. TaskMaster provides a novel means of viewing email in terms of user-defined activities. The user decides what items should be represented as activities (which are termed thrasks as defined above). The user can create thrasks by manually including (e.g., dragging) a message or other item into a thrask viewing pane. The user can add further messages or items to this same thrask. TaskMaster then begins to track any subsequent messages in the same threads as those already included in the thrask. An advanced embodiment of TaskMaster can track versions of the same document created and saved by a user on their own system, once they are added to a thrask in TaskMaster.

In TaskMaster, email is organized not in terms of folders or threads, but in terms of a dynamically filtered collection or thrask (with the possibility of manual inclusion or exclusion of individual items). This means that, unlike threads, which use only message data to automatically compute a collection as in Microsoft's threaded browser, multiple threads may now relate to a single thrask, and other items such as documents, notes or random email messages may also be included manually in the thrask by a user of the system.

Unlike folders and filters, thrasks do not require the user to set up a rule to have items be automatically added to a thrask.

Mail messages and other items can be seen as representing or relating to tasks or subcomponents of a task. Thus, any item such as a message, document, hyperlink, note and so on can stand for a task. This means that all items have deadline and reminder properties, which the user can leave unspecified or can set to some date. Further, even as task proxies, these elements remain displayed in the normal email client viewer. This contrasts with Outlook's tasks, which are functionally, and in terms of the user-interface, distinct from email messages, documents and so on. In Outlook, the tasks are organized in a separate collection.

For every item with a reminder or deadline or both, including messages, documents, links, notes and so on, the user will receive a notification when the date for the reminder or deadline arrives.

Users will have practically continuous feedback about approaching deadlines and reminders associated with thrask collections (and possibly with individual items). The nearest approaching deadline and the nearest approaching reminder are represented at the top level of the user interface within the default content viewer, without the user having to open individual items to inspect them. In one implementation, this continuous notification is embodied as a bar for the nearest reminder or for the nearest deadline. In one embodiment of TaskMaster, these notification indicators change color along their length or grow in length as the specified date approaches.

Since all items are proxies for tasks, pending actions or obligations being waited upon are explicitly represented at the top level of the user interface of the email client. In one embodiment, obligations (of the user or of others) are represented at the item level and at the thrask level. At the item level, a mark (e.g., a red or blue ball) is associated with the item to show there is an obligation (mine or someone else's) associated with it. At the thrask level, aggregation of obligations is represented as a group of marks (e.g., balls) associated with a thrask and these marks also distinguish user obligations from other's obligations. These obligations must be user defined using an interface mechanism for changing the status of items within the thrask. The size of the group of marks grows as the obligations build up within the thrask by being associated one-by-one and one-to-one with items within that thrask. These differ from Outlook's Flags in that information about the nature of the action is visible at the top level of the interface (without having to open any item or dialog box). In another embodiment, the user is able to associate different colored or shaped balls or icons with specific people or actions.

For any thrask, the user can select an option that shows the names of all the people whose names appear in the From: To: or Cc: lines of each message with a specified obligation. These will be people to whom an action is owed or from whom an action is expected. Common actions can then easily be associated with these names via a cascading menu or some other mechanism (as shown in FIG. 11).

A thrask may be created with an incoming message automatically (for example, by the arrival of a message related to a preceding message in terms of message ID, sender or subject line) or it may be restricted to an explicit user choice only. But, users can also create a thrask by adding an item that is not a message, such as a document or a link, to the system. In such a case, no automatic filtering will take place until a message is added to the thrask, whereupon related incoming messages will be added automatically by the system. However, it is possible to automatically include new versions of the same document (or file) once they are included in TaskMaster.

Items can also be suggested for thrasks based upon their content even if they are not actually automatically filtered into a thrask. Indicators for low certainty and high certainty can be added to the suggestions.

TaskMaster includes a deferral mechanism, which allows the user to see a timely appearance of upcoming task activity. When the user receives a message into or adds a new item to TaskMaster's thrask collection, if it is not already added to a thrask, it may become a thrask in its own right. At any time after the creation of a thrask in any way, the user can select a system option to defer the thrask until a selected date, whereupon it disappears out of the normal thrask view of the system. In one implementation, if any new information item is acquired by the thrask before the specified date, the thrask will reappear and can be deferred once again. In another implementation, the user can opt not to see any incoming content item to the thrask until the specified date. In yet another implementation, the user can make a selection to see all deferred thrasks at any time. In still another implementation, users may similarly defer individual thrask items.

TaskMaster clients can synchronize regularly with a shared workgroup client on a server to provide a shared view of a thrask. Users simply opt to share or un-share a thrask, or items in a thrask, by interacting with their TaskMaster client (an embodiment of a workgroup system is shown in FIG. 18). An augmented TaskMaster client and/or alternative group client could provide personal and public views onto the shared thrask information, including shared items, public obligations, deadlines, upcoming reminders and so on.

It is central to this approach to note that, whether or not a central server is included to support shared views of thrasks and items in thrasks, through a combination of the mechanisms discussed above, users of TaskMaster receive support of the kind provided by a workflow tool with no up-front model of any process being required, thus requiring no a priori system set-up for users. The combined effect of the mechanisms is to provide support for emergent and flexible workflow management. In other words, TaskMaster provides resources for users to create and manage workflows from an individual perspective by tracking deadlines and obligations that are created by individual participants from the individual perspective on the fly. Any process model is thus simply inferred by users, based on the contextual information available in the informal and impromptu messages that are passed back-and-forth.

Thus, this approach stands in contrast to the popular model of having a centralized workflow model keep track of a pre-specified set of obligations and affords more flexible workgroup performance than traditional workflow approaches.

A central notion of the TaskMaster-based workflow system is that workflow need not be defined by an explicit system model to be embodied in some system that controls access and information flow according to a pre-defined plan or specification, or even a flexible, but in some way preconceived plan or specification. It is already known that workflow processes can be emergent and highly flexible and can exist entirely in the heads of the participants or in the informal workplace culture rather than anywhere else. TaskMaster provides previously non-existent resources for managing this emergent workflow that are deeply embedded in an email tool that people would typically use for general purpose messaging. The TaskMaster-based workflow system does not require any shared, centralized resource for capturing any elements of the workflow (and does not require that everyone or even more than one person be using the TaskMaster resources for them to work; others can simply use a normal email tool). The workflow management emerges from the combination of many people separately managing their piece of the overall pattern and flow of information and obligations using the information management resources. In particular these resources are: heterogeneous collections of items such as messages and documents that are automatically maintained and updated by the system but with flexible user customizations of creation, inclusion and exclusion; and metadata such as obligations, deadlines, reminders and deferrals that can be associated with those items and the collections to which they belong.

However, in spite of the above, it is clear that the embodiment of the shared workgroup system of the present invention could also copy and keep track of certain public, but individually created, deadlines and obligations in a central location on a server (but this would still require no pre-specification of any process-related to-dos or dependencies). This would simply allow public actions to be publicly represented, by building a shared workflow representation from the individual pieces.

The following is one example of how a shared workgroup-enhanced TaskMaster implementation would work.

A user may publish certain items for a workgroup identified by a unique email address and/or url, with members of the workgroup identified by their email address and a password (that can be distributed in email) or in some other manner that can be managed by the system.

A web or some other locally shared specialized client interface could be developed to manage access by workgroup members to a centralized server.

The system would then offer the user the option of saving a thrask in a public form such that any items added to the thrask will be accessible to all members of the workgroup. Thus all thrasks would have a "share" option available, and shared thrasks would be indicated through some mechanism, such as a shared/not shared icon on each thrask in the standard TaskMaster browser.

In another embodiment, the system would only submit certain items from the user's private version of the thrask to the public version of the thrask (this could be determined by automatic processing criteria such as whether the item is related by message ID or subject line to a previously published item, or by explicit user action). This would minimize clutter that is only relevant to one person in the public view. Thus all individual items would have a "share" option available and each item would have a shared/not shared icon.

Actions (being defined purely as "mine" or "someone else's" in the single user case described earlier) in the workgroup version of the thrask could now be defined as being identified with a named user. Thus, the thrask list pane and the item list pane equivalents for a workgroup on a shared server would have to have a wider column identifying (possibly by email address) who is responsible for the action items, rather than the thin column with the red and blue balls for the single user case.

Rather than a fixed model of how the work is to be accomplished and in what order as in a traditional workflow model, this model allows for flexible sharing of information about who is responsible for what. The context for the actions will appear in the public thrask (email and other items collection). Further messages to the thrask can provide updates as to whether someone has passed the work on to someone else with a message saying why.

A history view of persons responsible for each item can be accessible by clicking on the action column. This makes people accountable to their workgroup colleagues for making changes to "who is currently responsible" for an item in the thrask.

In a more sophisticated embodiment of the workflow system of the present invention, individual clients would able to poll the central server for updates to a thrask made by other people. New content sent to the shared thrask could be downloaded to the local client automatically, keeping both versions in synchronization (though private versions would contain more content that is only relevant to the owner).

A further refinement would be to store only email messages on the central server and have documents that demand storage space always be downloaded to local users' machines to be accessible from their local version of the thrask.

Individual users would be notified if someone else assigns a shared item on the server that they have a copy of (see A, C or E in FIG. 18) to them with an automatically generated updated copy of the item being sent to their personal version of the thrask. Another variation on the same theme would be to have, in the user's personal thrask view, actions changing from other to self or vice versa, appear different (changing from red to blue or blue back to red).

FIG. 18 shows an exemplary schematic of a workgroup-enhanced architecture for TaskMaster. Individual users' TaskMaster clients 1802, 1804 handle email exchanges and Outlook server-based archiving as described previously (thick dashed line) but these clients also update and are updated by a centralized thrask server 1806 with items that users opt to share by clicking on a share icon (indicated by letters A, C and E in bold). A group client 1808 (which may be implemented as an integrated part of the standard TaskMaster client) provides a view onto the shared thrask content. TaskMaster clients simply indicate that some items in a thrask are shared (indicated here as bold).

Another way of implementing a workflow-enhanced version of TaskMaster would be to have a software module on the workgroup's Outlook Exchange or IMAP mail server that would provide an augmented, shared view onto the mail server content, in much the same way that TaskMaster provides an augmented view onto a user's Outlook client's content.

Figure 19:
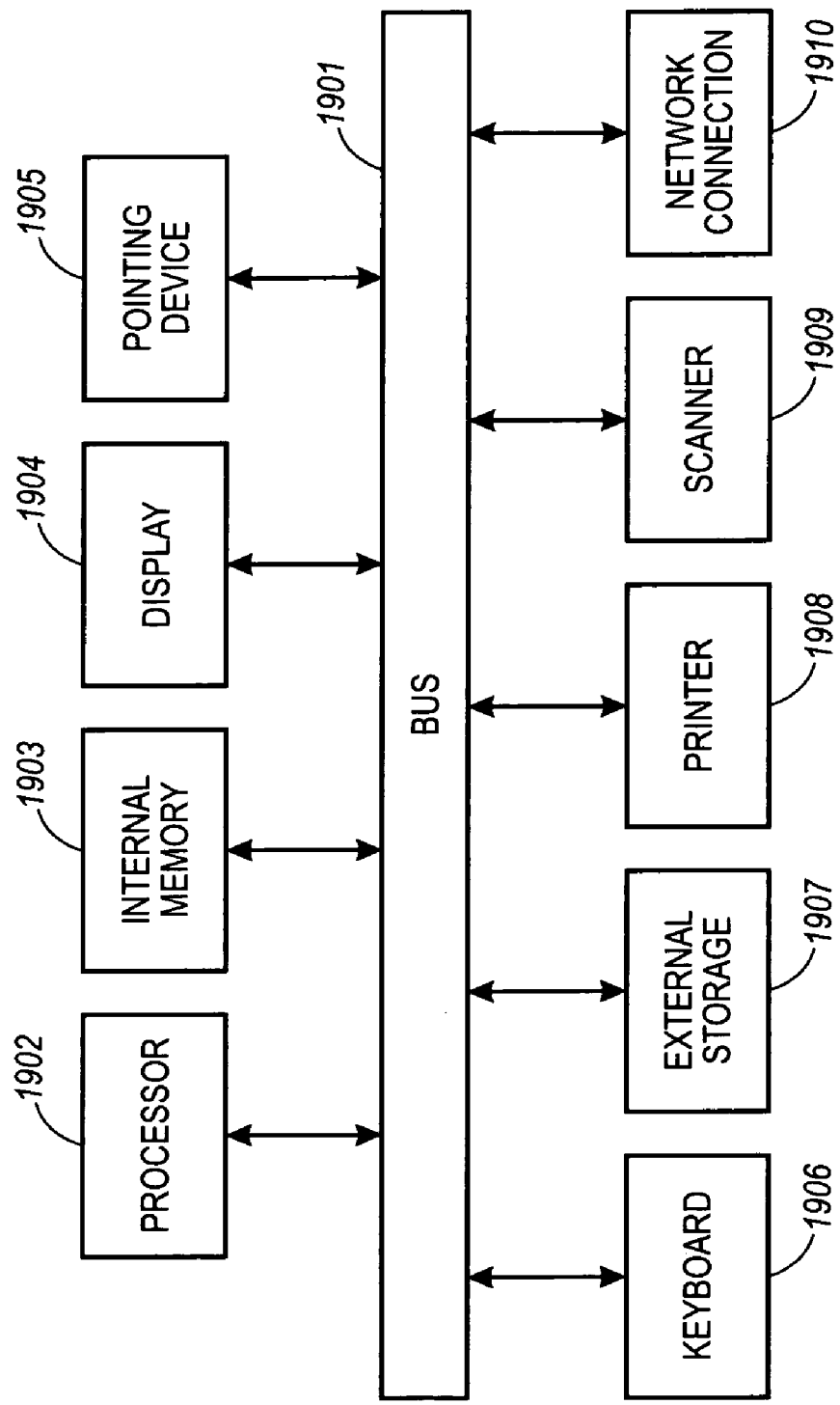
FIG. 19 shows in block diagram form a computer based system upon which the TaskMaster system may be implemented.

The TaskMaster system may be implemented using software-programming instructions with conventional programming techniques to operate a computer-controlled system. A computer-controlled system as may be utilized to implement the TaskMaster system is illustrated in a simplified block diagram form with reference to FIG. 19. Referring to FIG. 19, the computer-based system is comprised of a plurality of components coupled via a bus 1901. The bus 1901 may include a plurality of parallel buses (e.g., address, data and status buses) as well as a hierarchy of buses (e.g., a processor bus, a local bus and an I/O bus). In any event, the computer system is further comprised of a processor 1902 for executing instructions provided via bus 1901 from Internal memory 1903 (note that the Internal memory 1903 is typically a combination of Random Access or Read Only Memories). When in operation, program instructions for carrying out the various functional components of the present invention are stored in internal memory 1903. The processor 1902 and Internal memory 1903 may be discrete components or a single integrated device. The processor 1902 and internal memory 1903 comprise circuitry for performing the various processing functions described herein. Also coupled to the bus 1901 is external storage 1907. The external storage 1907 is typically a high capacity storage media such as magnetic or optical disk storage.

Also coupled to the bus 1901 is a display 1904 and a pointing device 1905. The pointing device 1905 may be a stylus, mouse, track-ball or other cursor control device. The network connections 1910 provides means for attaching to a network, e.g., a Local Area Network (LAN) card or modem card with appropriate software. Such access may be to the Internet or to local Intranets or both. Besides communication access, the network connection 1910 may be used to access vanous resources (i.e. servers) such as shared computing, storage or printing resources.

Moreover, the computer controlled system upon which TaskMaster may be implemented includes the various forms of systems such as workstation computers, laptop computers Personal Digital Assistants, Notebook computers, mainframe systems, client-server systems and the like.

While certain exemplary embodiments have been described in detail and shown in the accompanying drawings, it is to be understood that such embodiments are merely illustrative of and not restrictive on the broad invention. It will thus be recognized that various modifications, such as those mentioned above, may be made to the illustrated and other embodiments of the invention described above, without departing from the broad inventive scope thereof. For example, while the system described herein is described as a separate application apart from the e-mail application, it would be apparent to one of skill in the art that the present invention could be implemented as integrated with or additional provided to, an existing e-mail system. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for managing and tracking information items within a message-based system on a user system, the message-based system having a viewer, the method comprising the operations of:
   (a) generating a thrask, the thrask comprising a collection that associates a plurality of information items, at least one information item in the plurality of information items having a first set of metadata, the collection capable of associating a document information item and a message information item;
   (b) sorting a new information item into the thrask in accordance with at least one criterion responsive to the first set of metadata, the new information item having a second set of metadata; and
   (c) displaying, in the viewer, the thrask and at least one displayed metadataum selected from the first set of metadata or the second set of metadata.

2. The method of claim 1 further comprising the operation of:
   (d) updating at least one of the metadata in the first set of metadata.

3. The method of claim 1, wherein operations (a), (b) and (c) are embedded in the message-based system.

4. The method of claim 1, wherein the new information item is a new message.

5. The method of claim 1, wherein the new information item is a new document, and wherein the new document is attached to a new message, is stored on the user system or is accessible by the user system over a network.

6. The method of claim 1, wherein the first set of metadata comprises task-related information.

7. The method of claim 6, wherein the task-related information comprises a deadline.

8. The method of claim 6, wherein the task-related information comprises a specified date and wherein operation (c) further comprises displaying a notification when the specified date arrives.

9. The method of claim 8, wherein operation (c) further comprises displaying a dialog box configured to receive a response.

10. The method of claim 1, wherein the first set of metadata includes a first specified date, the second set of metadata includes a second specified date, and wherein operation (c) further comprises determining a nearest specified date responsive to the first and second specified dates, and displaying an indicator responsive to the nearest specified date.

11. The method of claim 10, wherein the indicator changes in appearance as the nearest specified date gets closer.

12. The method of claim 1, wherein operation (a) is performed in response to a user action performed on an information item.

13. The method of claim 12, wherein the viewer includes a thrask-viewing pane and wherein the user action comprises the action of manually dragging the at least one information item into the thrask-viewing pane.

14. The method of claim 1, wherein operation (a) comprises automatically generating a new thrask when a predetermined criterion is satisfied.

15. The method of claim 1, wherein the new information item is a new message, the at least one information item is a prior message, and the at least one criterion is that the new message is a response to the prior message.

16. The method of claim 1, wherein operation (b) is performed in response to a user action, the user action including the action of manually dragging the new information item into a visual, display of the thrask.

17. The method of claim 1, wherein the viewer comprises a thrask-viewing pane and an item list pane, and wherein operation (c) further comprises displaying the thrask in the thrask-viewing pane and displaying the at least one displayed metadataum in the item list pane.

18. The method of claim 1, wherein the viewer further comprises a content viewing pane and wherein operation (c) further comprises displaying in the content viewing pane the content of one of the plurality of information items.

19. The method of claim 1, wherein operation (c) further comprises displaying a mark indicating an obligation associated with one of the plurality of information items.

20. The method of claim 1, wherein operation (c) further comprises displaying a group of marks indicating obligations associated with the thrask, the group of marks corresponding to two or more of the plurality of information items.

21. The method of claim 20, wherein, a first subset of the group of marks represent obligations of a user and a second subset of the group of marks represent obligations of correspondents of the user.

22. The method of claim 1, wherein the first set of metadata includes one or more of a "From:" entry, a "To:" entry and a "Cc:" entry, and wherein operation (c) further comprises displaying, one or more names that appear in any of the "From:" entry, the "To:" entry or the "Cc:" entry.

23. The method of claim 1, wherein displaying the thrask is responsive to a display condition and wherein operation (c) further comprises determining the thrask display condition responsive to a user-specified date and a deferral option.

24. The method of claim 1, wherein operation (c) further comprises:
   determining an information item display condition responsive to a user-specified date and a deferral, option; and
   displaying the at least one displayed metadataum responsive to the information item display condition.

25. A system for managing and tracking information items within a message-based system on a user system, the message-based system including a viewer, the system comprising:
   (a) a thrask generating module configured to generate a thrask, the thrask comprising a collection that associates a plurality of information items, at least one information item in the plurality of information items having a first set of metadata, the collection capable of associating a document information item and a message information item;
   (b) a sorting module configured to sort a new information item into the thrask in accordance with at least one criterion responsive to the first set of metadata, the new information item having a second set of metadata; and (c) a display module configured to display the thrask and at least one displayed metadataum selected from the first set of metadata or the second set of metadata.

26. The system of claim 25 further comprising:
(d) an updating module configured to update at least one of the metadata in the first set of metadata.

27. The system of claim 25, wherein the thrask-generating module, the sorting modules and the display module are embedded in the message-based system.

28. The system of claim 25, wherein the new information is a new message.

29. The system of claim 25, wherein the new information item is a new document, and wherein the new document is attached to a new message, stored on the user system or is accessible by the user system over a network.

30. The system of claim 25, wherein the first set of metadata comprises task-related information.

31. The system of claim 30, wherein the task-related information comprise a deadline.

32. The system of claim 30, wherein the task-related information comprises a specified date, and wherein the display module is configured to display a notification when the specified date arrives.

33. The system of claim 32, wherein the display module is confirmed to display a dialog box configured to receive a response.

34. The system of claim 25, wherein the first set of metadata includes a first specified date, the second set of metadata includes a second specified date, and wherein the display module further comprises a date-comparison module confirmed to determine a nearest specified date from the first and second specified dates, the display module confirmed to display an indicator responsive to the nearest specified date.

35. The system of claim 34, wherein the indicator changes in appearance as the nearest specified date gets closer.

36. The system of claim 25, wherein the thrask-generating module activates in response to a user action performed on an information item.

37. The system of claim 36, wherein the viewer includes a thrask-viewing pane and wherein the user action comprises the action of manually dragging the at least one information item into the thrask-viewing pane.

38. The system of claim 25, wherein the thrask-generating module is configured to automatically generate a new thrask when a predetermined criterion is satisfied.

39. The system of claim 25, wherein the new information item is a new message, the at least one information item is a prior message, and the at least one criterion is that the new message is a response to the prior message.

40. The system of claim 25, wherein the sorting module activates in response to a user action, the user action including the action of manually dragging the new information item into a visual, display of the thrask.

41. The system of claim 25, wherein the sorting module is further configured to provide a suggestion that the new information item be sorted into the thrask.

42. The system of claim 25, wherein the viewer comprises a thrask-viewing pane and an item list pane, and wherein the display module is further configured to display the thrask in the thrask-viewing pane and to display the at least one displayed metadataum in the item list pane.

43. The system of claim 25, wherein the viewer further comprises a content viewing pane and wherein the display module is configured to display in the content viewing pane the content of one of the plurality of information items.

44. The system of claim 25, wherein the display module is further configured to display a mark to indicate an obligation associated with one of the plurality of information items.

45. The system of claim 25, wherein the display module displays a group of marks indicating obligations associated with the thrask, the obligations being user-defined, the marks corresponding to some of the information items included in the thrask.

46. The system of claim 45, wherein, a first subset of the group of marks represent obligations of a user and a second subset of the group of marks represent obligations of correspondents of the user.

47. The system of claim 25, wherein the first set of metadata includes one or more of a "From:" entry, a "To:" entry and a "Cc:" entry, and wherein the display module is further configured to display one or more names that appear in any of the "From:" entry, the "To:" entry or the "Cc:" entry.

48. The system of claim 25, wherein the display module is responsive to a display condition and further comprises a deferral module configured to determine the display condition responsive to a user-specified date and a deferral, option.

49. The system of claim 25, wherein the display module is configured to condition display of the at least one displayed metadataum responsive to an information item display condition and further comprises a deferral, module configured to determine the information item display condition responsive to a user specified date and a deferral, option.

50. The method of claim 6, wherein the task-related information comprises a reminder.

\* \* \* \* \*